US011146366B2

(12) United States Patent
Takeda et al.

(10) Patent No.: US 11,146,366 B2
(45) Date of Patent: Oct. 12, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/482,641

(22) PCT Filed: Feb. 1, 2018

(86) PCT No.: PCT/JP2018/003324
§ 371 (c)(1),
(2) Date: Jul. 31, 2019

(87) PCT Pub. No.: WO2018/143316
PCT Pub. Date: Aug. 9, 2018

(65) Prior Publication Data
US 2020/0014491 A1 Jan. 9, 2020

(30) Foreign Application Priority Data
Feb. 1, 2017 (JP) .............................. JP2017-017127

(51) Int. Cl.
*H04L 1/18* (2006.01)
*H04L 5/00* (2006.01)
(Continued)

(52) U.S. Cl.
CPC ............ *H04L 1/189* (2013.01); *H04L 1/1819* (2013.01); *H04L 5/0055* (2013.01);
(Continued)

(58) Field of Classification Search
CPC ............ H04L 5/00; H04L 1/18; H04W 28/04; H04W 72/04; H04W 76/27; H04W 80/02
See application file for complete search history.

(56) References Cited

U.S. PATENT DOCUMENTS

2010/0215007 A1* 8/2010 Zhang .................. H04L 1/0071
370/329
2015/0341914 A1* 11/2015 Lee .................. H04W 72/0453
370/329
(Continued)

FOREIGN PATENT DOCUMENTS

EP        3474475 A1    4/2019
WO    2018/106063 A1    6/2018

OTHER PUBLICATIONS

International Search Report issued in PCT/JP2018/003324 dated Apr. 24, 2018 (2 pages).
(Continued)

*Primary Examiner* — Anez C Ebrahim
(74) *Attorney, Agent, or Firm* — Osha Bergman Watanabe & Burton LLP

(57) ABSTRACT

The present invention is designed so that retransmission control is executed appropriately in smaller units than TBs (for example, in units of CBs, in units CBGs, etc.). A user terminal according to one aspect of the present invention has a receiving section that receives a downlink (DL) signal including one or more code blocks (CBs), and a control section that controls transmission of delivery acknowledgment information for the DL signal per CB or per code block group (CBG) including or one or more CBs, and a CB or a CBG where a negative acknowledgment (NACK) is indicated by the delivery acknowledgment information is retransmitted by using a numerology that is the same as or different from that of initial transmission.

7 Claims, 16 Drawing Sheets

(51) Int. Cl.
*H04W 28/04* (2009.01)
*H04W 72/04* (2009.01)

(52) U.S. Cl.
CPC .......... *H04L 5/0082* (2013.01); *H04W 28/04* (2013.01); *H04W 72/042* (2013.01)

(56) References Cited

U.S. PATENT DOCUMENTS

| | | |
|---|---|---|
| 2016/0226643 A1 | 8/2016 | Mallik et al. |
| 2019/0181986 A1 | 6/2019 | Kitamura et al. |
| 2019/0372720 A1* | 12/2019 | Lee .................. H04L 1/1812 |
| 2020/0077386 A1 | 3/2020 | Papasakellariou |

OTHER PUBLICATIONS

Written Opinion of the International Searching Authority issued in PCT/JP2018/003324 dated Apr. 24, 2018 (4 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

NTT Docomo, Inc.; "Data scheduling and HARQ-ACK feedback procedures for NR"; 3GPP TSG RAN WG1 AH_NR Meeting, R1-1700625; Spokane, USA; Jan. 16-20, 2017 (6 pages).

LG Electronics; "Discussion on extended TTI bundling for UL VoIP with semi-persistent scheduling"; 3GPP TSG RAN WG1 Meeting #69, R1-122316; Prague, Czech Republic; May 21-25, 2012 (4 pages).

NTT Docomo, Inc.; "Views on HARQ enhancements for NR"; 3GPP TSG RAN WG1 Meeting #88, R1-1702815; Athens, Greece; Feb. 13-17, 2017 (4 pages).

Extended European Search Report issued in counterpart European Patent Application No. 18747958.9, dated Nov. 20, 2020 (9 pages).

Samsung; "Discussion on partial retransmission for eMBB"; 3GPP TSG RAN WG1 Meeting NR#1, R1-1700959; Spokane, USA; Jan. 16-20, 2017 (4 pages).

* cited by examiner

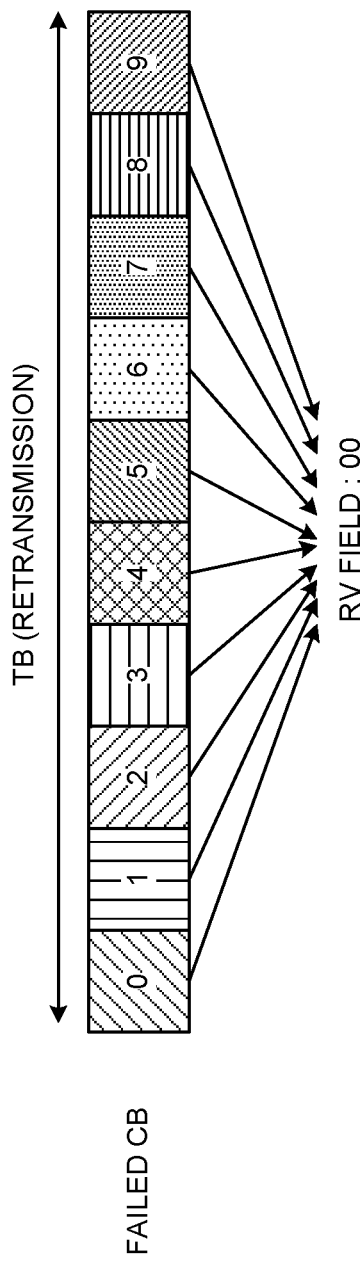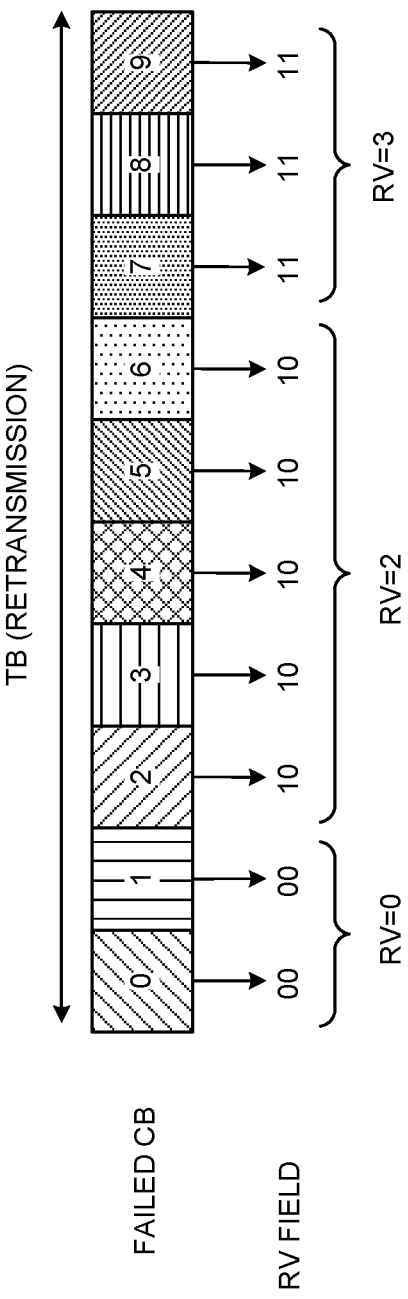
FIG. 5A
FIG. 5B

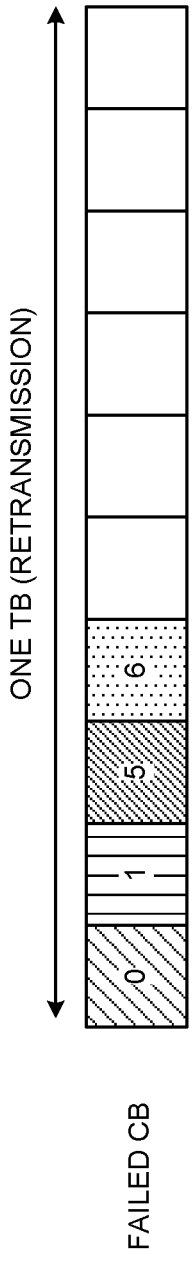
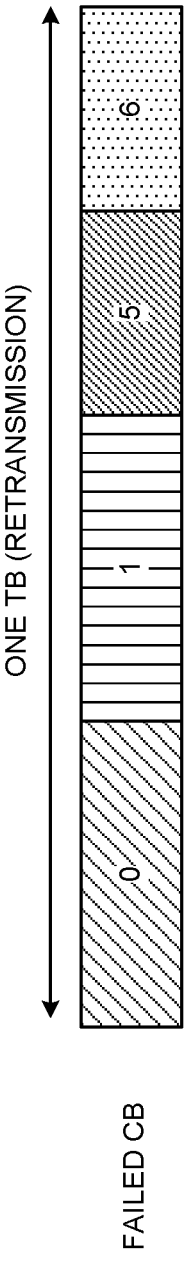
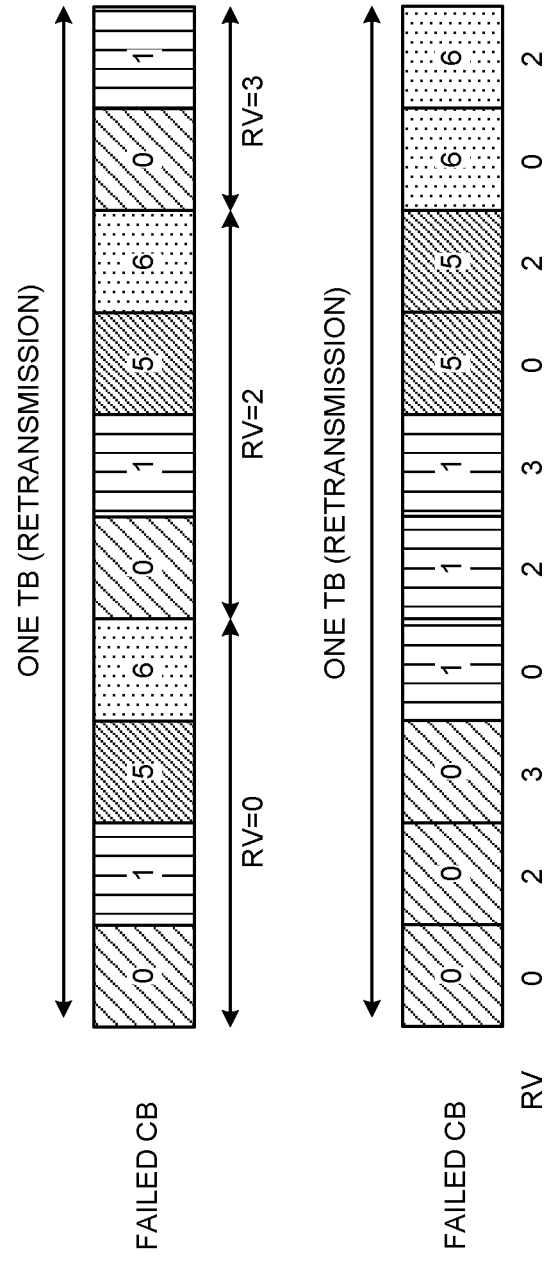
FIG. 6A
FIG. 6B
FIG. 6C
FIG. 6D

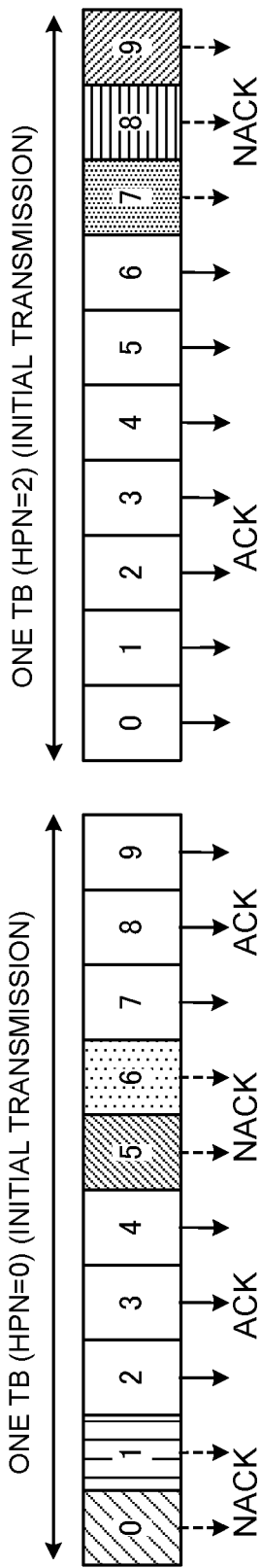
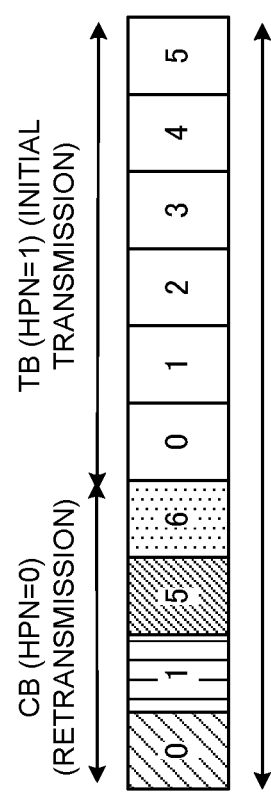
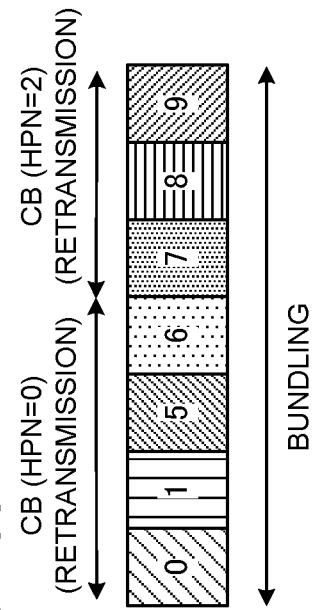
FIG. 10A
FIG. 10B
FIG. 10C

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). Also, the specifications of LTE-A (also referred to as "LTE-Advanced," "LTE Rel. 10 to 13," etc.) have been drafted for further broadbandization and increased speed beyond LTE (also referred to as "LTE Rel. 8 or 9"), and successor systems of LTE (also referred to as, for example, "FRA (Future Radio Access)," "5G (5th generation mobile communication system)," "NR (New RAT (Radio Access Technology)," "LTE Rel. 14 and later versions," etc.) are under study.

In existing LTE systems (for example, Rel. 13 and earlier versions), adaptive modulation coding (AMC), which adaptively changes at least one of the modulation scheme, the transport block size (TBS), and the coding rate, is executed for link adaptation. Here, the TBS is the size of transport blocks (TBs), which are units of information bit sequences. One or more TBs are assigned to one subframe.

Furthermore, in existing LTE systems, when the TBS exceeds a predetermined threshold (for example, 6144 bits), a TB is divided into one or more segments (code blocks (CBs)), and encoded in segment units (code block segmentation). Each encoded code block is concatenated and transmitted.

Also, in existing LTE systems, retransmission control (HARQ: Hybrid Automatic Repeat reQuest) for DL signals and/or UL signals is executed in TB units. To be more specific, in existing LTE systems, even when a TB is divided into multiple CBs, delivery acknowledgment information (also referred to as "ACK (ACKnowledgement)" or "NACK (Negative ACK)" (hereinafter abbreviated as "A/N"), "HARQ-ACK," and so on) is transmitted in TB units.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, 5G, NR, etc.), for example, a TBS that is larger than in existing LTE systems may be used in order to support high-speed and large-capacity communication (eMBB: enhanced Mobile Broad Band). TBs of such a large TBS may be divided into many CBs (for example, tens of CBs per TB), compared to existing LTE systems.

As described above, the number of CBs per TB is anticipated to increase in future radio communication systems, and, if retransmission control is executed in TB units as in existing LTE systems, CBs where no error is detected (CBs that are decoded successfully) are retransmitted, and, as a result of this, the performance (throughput) may be deteriorated. Therefore, for future radio communication systems, retransmission control that is executed in smaller units than TBs (for example, retransmission control that is executed in units of CBs or in units of groups (code block groups (CBGs)) that include a plurality of CBs is desirable.

The present invention has been made in view of the above, and it is therefore an object of the present invention to provide a user terminal and a radio communication method, whereby retransmission control can be executed appropriately in smaller units than TBs (for example, in units of CBs or in units of CBGs).

Solution to Problem

According to one aspect of the present invention, a user terminal has a receiving section that receives a downlink (DL) signal including one or more code blocks (CBs), and a control section that controls transmission of delivery acknowledgment information for the DL signal per CB or per code block group (CBG) including or one or more CBs, and, in this user terminal, a CB or a CBG where a negative acknowledgment (NACK) is indicated by the delivery acknowledgment information is retransmitted by using a numerology that is the same as or different from that of initial transmission.

According to another aspect of the present invention, a user terminal has a transmission section that transmits an uplink (UL) signal including one or more code blocks (CBs), and a control section that controls retransmission of the UL signals per CB or per code block group (CBG) including one or more CBs, based on downlink control information (DCI), and, in this user terminal, the transmission section retransmits the CB or CBG specified by the DCI by using a numerology that is the same as or different from that of initial transmission.

Advantageous Effects of Invention

According to the present invention, retransmission control can be executed appropriately in smaller units than TBs (for example, in units of CBs or in units of CBGs).

BRIEF DESCRIPTION OF DRAWINGS

FIGS. 5A and 5B are diagrams to show examples of RV fields for use in first CB/CBG retransmission according to a first aspect of the present invention;

FIGS. 6A to 6D are diagrams to show examples of first CB/CBG retransmission according to the first aspect;

FIG. 10A to 10C are diagrams to show examples of third CB/CBG retransmission according to the first aspect;

DESCRIPTION OF EMBODIMENTS

Figure 1:
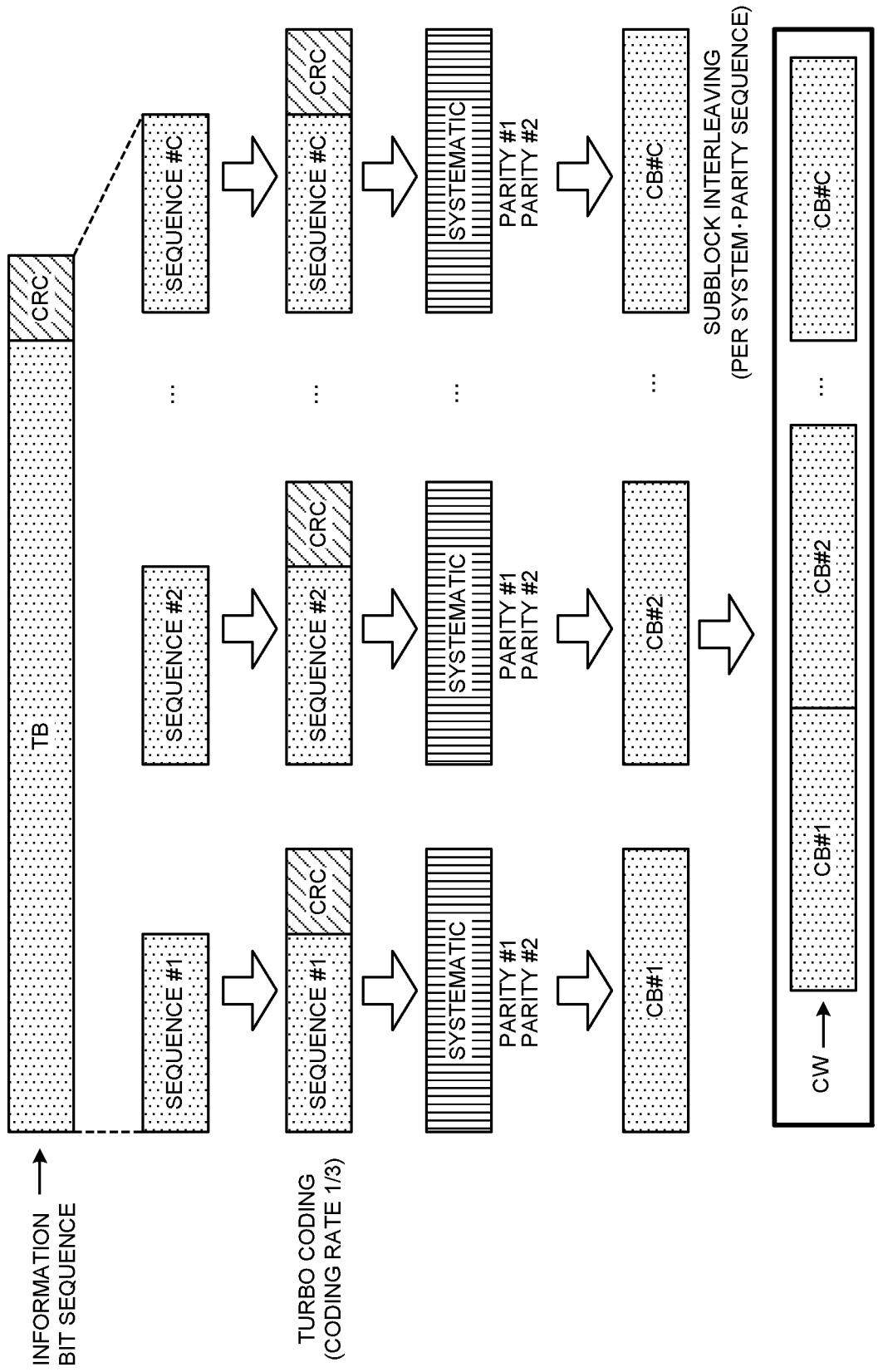
FIG. 1 is a diagram to show an example of transmission process where code block segmentation is employed.

FIG. 1 is a diagram to show an example of transmission process where code block segmentation is employed. In code block segmentation, when a transport block (hereinafter abbreviated as "TB") (an information bit sequence including CRC bits), to which CRC (Cyclic Redundancy Check) bits are appended, exceeds a predetermined threshold (for example, 6144 bits or 8192 bits), this TB is divided into a plurality of segments. Code block segmentation is executed, for example, to adjust the TBS to a size that is compatible with the encoder, and the above predetermined threshold may be equal to the maximum size that is compatible with the encoder.

As shown in FIG. 1, when the TB size (TBS) exceeds a predetermined threshold (for example, 6144 bits or 8192 bits), this information bit sequence, including CRC bits, is divided (segmented) into a plurality of segments on the transmitting side. Note that filler bits may be appended to the top of segment #1.

As shown in FIG. 1, CRC bits (for example, 24 bits) are appended to each segment, channel coding (for example, turbo coding, low density parity check (LDPC) coding, and so on) is performed at a predetermined coding rate (for example, ⅓, ¼, ⅛, etc.). By channel coding, systematic bits and parity bits (for example, first and second parity bits (#1 and #2)) are generated as code bits for each code block (hereinafter abbreviated as "CB").

Each CB is interleaved in a predetermined way, and a bit sequence of a volume to match the amount of scheduled resources is selected and transmitted. For example, this can be done as follows: the sequence of systematic bits, the sequence of first parity bits and the sequence of second parity bits are all interleaved separately (subblock interleaving) and input to a buffer (circular buffer), and, from the buffer, each CB's code bits are selected (rate matching) based on the number of REs that can be used in allocated resource blocks, the redundancy version (RV), and so on.

Each CB, comprised of selected code bits, is concatenated to form a codeword (CW). The codeword is subjected to scrambling, data modulation and so on, and then transmitted.

Figure 2:
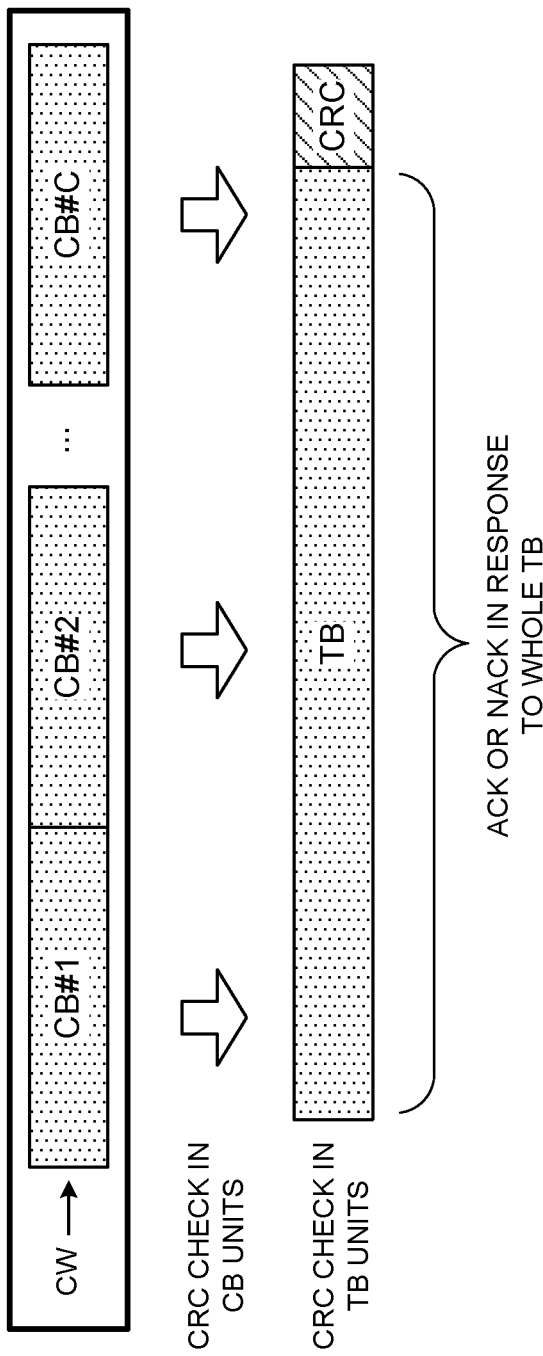
FIG. 2 is a diagram to show an example of receiving process where code block segmentation is employed.

FIG. 2 is a diagram to show an example of receiving process where code block segmentation is employed. On the receiving side, the TBS is determined based on the TBS index and the number of resource blocks allocated (for example, PRBs (Physical Resource Block)), and, based on the TBS, the number of CBs is determined.

As shown in FIG. 2, on the receiving side, each CB is decoded, and error detection of each CB is performed using the CRC bits appended to each CB. Also, code block segmentation is undone, so as to recover the TB. Furthermore, error detection of the whole TB is performed using the CRC bits appended to the TB.

On the receiving side in existing LTE systems, depending on error detection result of the whole TB, delivery acknowledgment information (an ACK or a NACK, which hereinafter will be abbreviated as "A/N," and which are also referred to as "HARQ-ACK" and so on) for the whole TB is sent to the transmitting side. On the transmitting side, the whole TB is retransmitted in response to a NACK from the receiving side.

Figure 3:
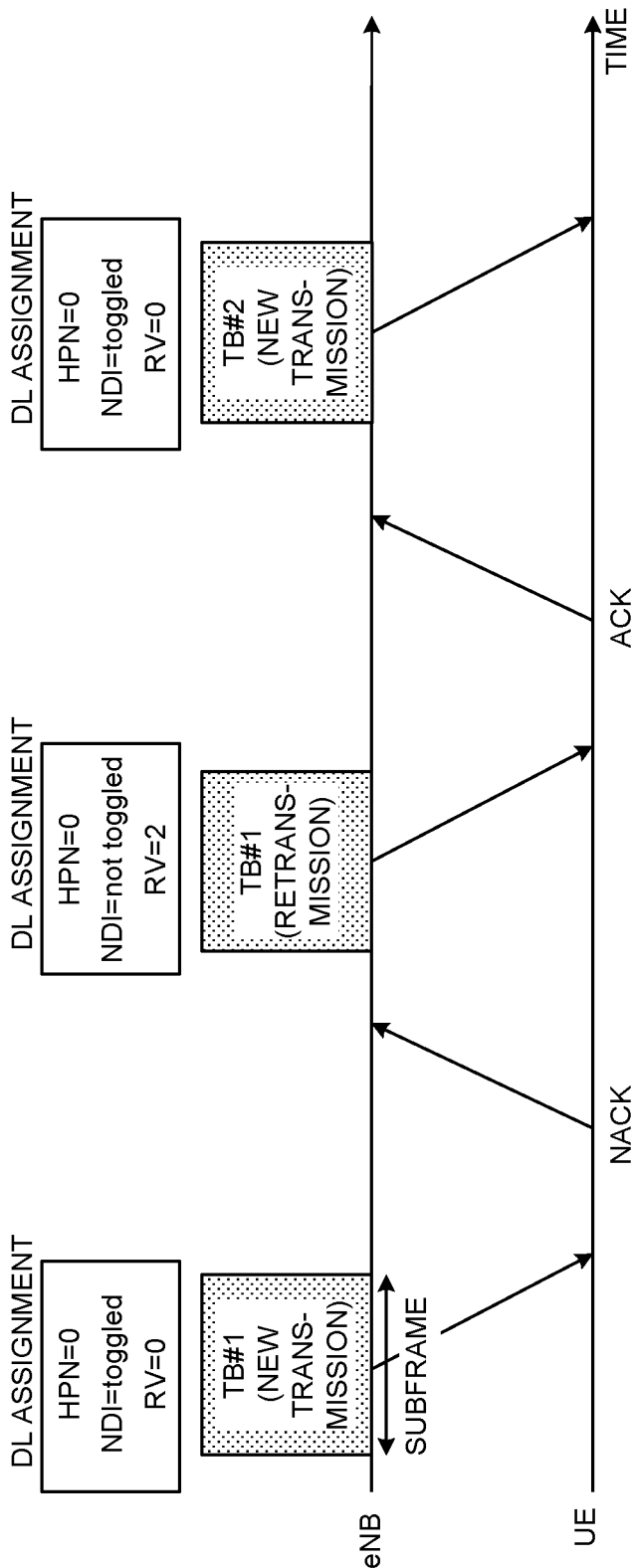
FIG. 3 is a diagram to show an example of DL retransmission control in an existing LTE system.

FIG. 3 is a diagram to show an example of retransmission control for DL signals in an existing LTE system. In existing LTE systems, retransmission control is executed on per a TB basis, irrespective of whether or not a TB is divided into a plurality of CBs. To be more specific, HARQ processes are assigned on a per TB basis. Here, HARQ processes are processing units in retransmission control, and every HARQ process is identified by a HARQ process number (HPN). One or more HARQ processes are configured in a user terminal (UE: User Terminal), in the HARQ process of the same HPN, the same data keeps being retransmitted until an ACK is received.

For example, referring to FIG. 3, HPN=0 is assigned to TB #1 for new (initial) transmission. Upon receiving a NACK, the radio base station (eNB: eNodeB) retransmits same TB #1 in HPN=0, and, upon receiving an ACK, the radio base station transmits next TB #2, for the first time, in HPN=0.

Also, in downlink control information (DCI) (DL assignment) that allocates the DL signal (for example, a PDSCH) for transmitting TBs, the radio base station can include the above HPN, a new data indicator (NDI) and a redundancy version (RV).

Here, the NDI is an indicator to distinguish between initial transmission and retransmission. For example, the NDI indicates retransmission if the NDI is not toggled in the same HPN (has the same value as the previous value), and indicates initial transmission if the NDI is toggled (has a different value from the previous value).

In addition, the RV indicates the difference in the redundancy of transmission data. The values of RVs include, for example, 0, 1, 2 and 3. 0 indicates the lowest degree of redundancy, and is used for initial transmission. By applying a different RV value to every transmission with the same HPN, HARQ gain can be achieved effectively.

For example, in FIG. 3, the DCI in the initial transmission of TB #1 includes the HPN "0," a toggled NDI, and the RV value "0." Therefore, the user terminal can recognize that the HPN "0" is initial transmission and decodes TB #1 based on the RV value "0." On the other hand, the DCI in the retransmission in TB #1 includes the HPN "0," an untoggled NDI, and the RV value "2." Therefore, the user terminal can recognize that the HPN "0" is retransmission, and decodes TB #1 based on the RV value "2." The initial transmission of TB #2 is the same as at the initial transmission of TB #1.

As described above, in existing LTE systems, retransmission control is executed on a per TB basis, regardless of whether or not code block segmentation is employed. For this reason, when code block segmentation is employed, if errors concentrate in a portion of C (C>1) CBs that are formed by dividing a TB, the whole TB is retransmitted. Consequently, not only the CBs where errors are detected (where decoding has failed), but also CBs where no error is detected (where decoding has been successful) are retransmitted, and therefore the performance (throughput) might deteriorate.

Now, when a TB is comprised of one or more CBs, at least one of a CB, a code block group (CBG), which includes a plurality of CBs, a TB, and a plurality of TBs that are bundled may serve as the unit of retransmission control.

Figure 4A:
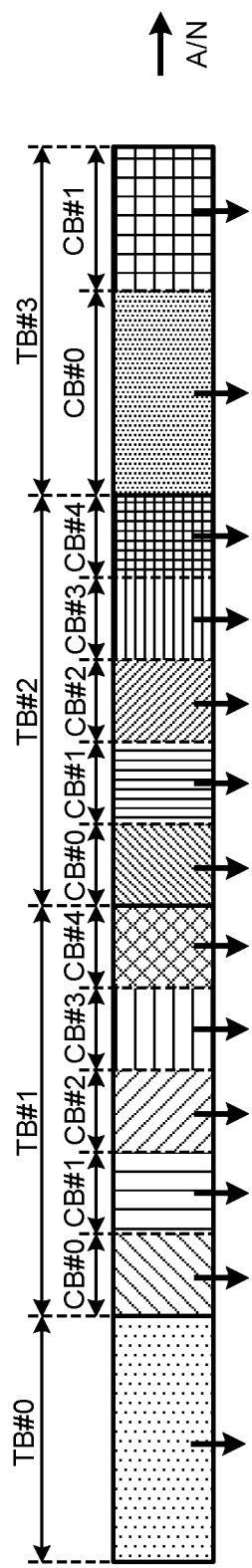
FIGS. 4A to 4C are diagrams to show examples of retransmission control units.
Figure 4B:
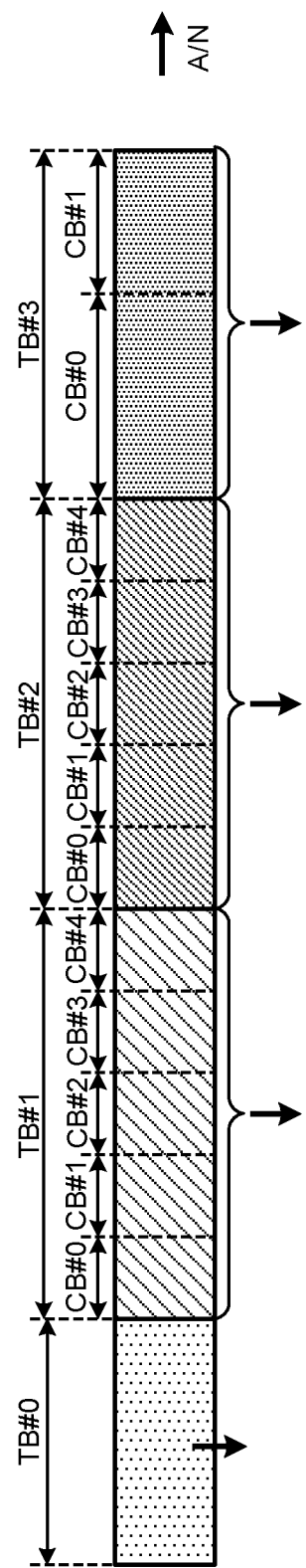
Figure 4C:
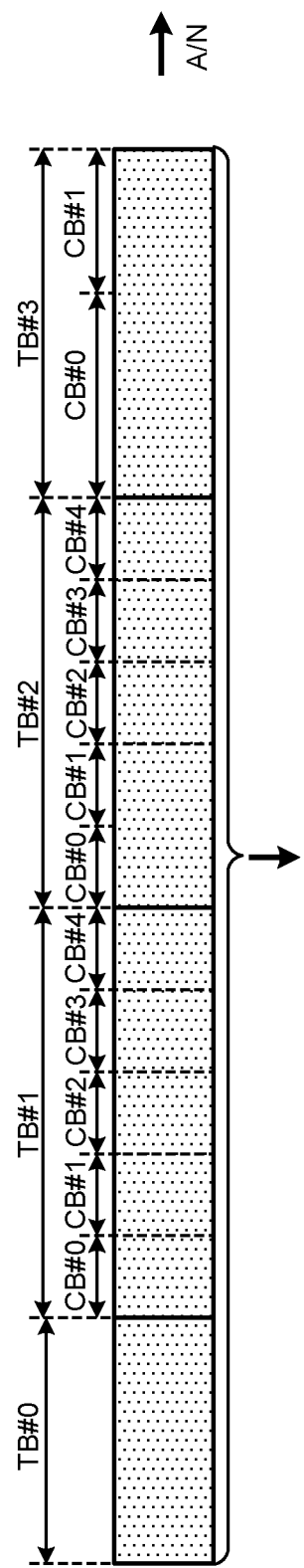

FIG. 4 provide diagrams to show examples of retransmission control. FIGS. 4A to 4C show examples where there are four TBs #0 to 3. Also, TB #0 is comprised of a single CB. TBs #1 and #2 are each comprised of five CBs #0 to #4. TB #3 is comprised of two CBs #0 and #1.

FIG. 4A shows an example of retransmission control per CB (also referred to as "CB-based HARQ-ACK," and so on). In FIG. 4A, the user terminal performs error detection (decoding) for each CB by using the CRC bits appended to each CB. Based on the error detection result of each CB, the user terminal generates bits that indicate A/N (hereinafter also referred to as "A/N bits," "HARQ-ACK bits," etc.), on a per CB basis, and feeds back (transmit) these bits to the radio base station.

As shown in FIG. 4A, when A/N bits are fed back on a per CB basis, the resolution of A/N feedback in response to DL signals is higher than in existing LTE systems (for example, Rel. 13 and earlier versions). As a result of this, although the system performance becomes higher than existing LTE systems, UL overhead may increase. Note that, although not illustrated, A/N bits may be generated on a per CBG basis, not on a per CB basis, and fed back to the radio base station.

FIG. 4B shows an example of A/N retransmission control per TB (also referred to as "TB-based HARQ-ACK" and so on). In FIG. 4B, the user terminal restores each TB from one or more CBs, and performs error detection for each TB using the CRC bits appended to each TB. Based on the error detection result of each TB, the user terminal generates A/N bits on a per TB basis, and feeds them back to the radio base station.

In FIG. 4B, the resolution of A/N feedback in response to DL signals is lower than in FIG. 4A. As a result of this, although the system performance is poor compared to retransmission control in CB units, it is possible to prevent the growth of UL overhead.

FIG. 4C shows an example of A/N transmission control in units of multiple TBs that are bundled (also referred to as "HARQ-ACK bundling," and so on). In FIG. 4C, based on the error detection results of a plurality of TBs that are bundled, the user terminal generates one A/N bit for all of a plurality of TBs, and feeds this back to the radio base station. For example, in FIG. 4C, one A/N bit is fed back, covering all of TB #0 to TB #3.

In FIG. 4C, the resolution of A/N feedback in response to DL signals is even lower than FIG. 4B. As a result of this, the overhead in the UL is reduced, and therefore this transmission control is useful for reserving UL coverage and/or capacity.

In future radio communication systems (for example, 5G, NR, etc.), communication at higher speeds and with larger capacity (eMBB) than existing LTE systems is anticipated, so that there may be more cases where a TB is divided into many CBs (for example, tens of CBs).

It then follows that, in order to prevent the deterioration of performance (throughput) due to retransmission of CBs in which no error is detected (and which have been decoded successfully), retransmission control in smaller units than TBs (for example, in units of CBs or in units of CBGs) is desirable. The problem in this case is how to retransmit retransmission data in smaller units than TBs (for example, CBs or CBGs). So the present inventors have studied a method of appropriately retransmitting retransmission data in smaller units than TBs (for example, CBs or CBGs), and arrived at the present invention.

Now, embodiments of the present invention will be described below in detail with reference to the accompanying drawings. Note that, although the present embodiment will be described below assuming asynchronous retransmission control (asynchronous HARQ), the present embodiment can be appropriately applied to synchronized retransmission control (synchronous HARQ) as well. In synchronous HARQ, retransmission of each HARQ process is carries out after a certain period from the initial transmission. On the other hand, in asynchronous HARQ, retransmission of each HARQ process is carried out after an unspecified period from the initial transmission of UL data.

Also, although the present embodiment will assume the use of a DL shared channel (for example, PDSCH: Physical Downlink Shared Channel) as a DL signal, this is by no means limiting. For example, the retransmission control according to the present embodiment can also be applied to retransmission control such as random access response (RAR). Also, the present embodiment can be applied to UL signals such as a UL shared channel (for example, PUSCH: Physical Uplink Shared Channel).

Also, the transport block (TB) according to the present embodiment is the unit of information bit sequences, and may be, for example, at least one of the information bit sequence unit allocated to one subframe, or the unit of scheduling. Also, the TB may or may not include CRC bits.

The code block (CB) according to the present embodiment is the unit of information bits that can be input to the encoder (for example, turbo encoder). In the event the TBS is less than or equal to the size that is compatible with the encoder (maximum coding size), a TB may be referred to as a "CB." Also, in the event the TBS exceeds the compatible size with the encoder, a TB may be divided into multiple segments, and each segment may be referred to as a "CB." Note that the transmission processes and the receiving processes that are performed when code block segmentation is applied, described earlier with reference to FIG. 1 and FIG. 2, are simply examples, and the present embodiment can be applied to any transmission process and receiving process to use CBs or CBGs.

(First Aspect)

With a first aspect of the present invention, a CB where a NACK is indicated (also referred to as a CB where decoding has failed (failed CB), a CB where an error has been detected, etc.) or the CBG including this CB, is retransmitted, using the same numerology as that used in the initial transmission. This CB or CBG may be transmitted using a TTI of the same time duration as that used in the initial transmission (first CB/CBG retransmission), or may be transmitted using a TTI of a different time duration than the initial transmission (second CB/CBG retransmission). Alternatively, this CB or CBG may be transmitted bundled with a TB that is initially transmitted in a different HPN from that of the CB or CBG, and/or transmitted bundled with a CB or a CBG that is retransmitted in a different HPN from that of the CB or CBG (third CB/CBG retransmission).

Here, the numerology may be at least one of the subcarrier spacing, the symbol duration, the cyclic prefix (CP) duration, the number of data symbols scheduled by one DCI, and others. Note that the number of data symbols may be referred to as a "TTI," a "subframe," a "slot," an "sTTI," a "minislot," and others.

<First CB/CBG Retransmission>

According to the first CB/CBG retransmission, a CB where a NACK is indicated (also referred to as a CB where decoding has failed, a CB where an error has been detected, and so on) or the CBG including this CB, is retransmitted using a TTI of the same numerology and the same time duration as those of the initial transmission.

In the first CB/CBG retransmission, DCI that schedules a DL signal may include, in addition to the HPN field, information that indicates each CB included in the DL signal (CB information), or information that indicates each CBG (CBG information). For example, the CB information may be the index of each CB (CB index) constituting the TB transmitted in the initial transmission. Furthermore, the CBG information may be the index of each CBG (CBG index), where the CBs constituting the TB transmitted in the initial transmission are grouped.

Also, according to the first CB/CBG retransmission, DL signals are scheduled and assigned HARQ processes in units of TBs, and DCI to schedule a DL signal includes the HPN assigned to the TB constituting the DL signal and the CB (or CBG) index of each CB (or CBG) in this TB. Furthermore, this DCI may include an NDI, which indicates whether or not the TB is transmitted for the first time.

Also, according to the first CB/CBG retransmission, DCI to schedule a DL signal may include one or more RV fields. To be more specific, in this DCI, an RV field that is common to all CBs in this TB may be included, or CB-specific or CBG-specific RV fields may be included.

With reference to FIG. 5 to FIG. 7, the first CB/CBG retransmission will be described in detail. Note that, in FIG. 5 to FIG. 7, it is assumed that retransmission is performed in units of CBs, but this is by no means limiting, and retransmission in CBG units is equally applicable. Note that, when retransmission is carried out in units of CBGs, if at least one CB in a CBG fails, a NACK is transmitted for the CBG where this CB is included, and this CBG is retransmitted.

<<RV Field>>

FIG. 5 are diagrams to show examples of RV fields for use in the first CB/CBG retransmission according to the first aspect. FIGS. 5A and 5B assume that the user terminal fails to decode all of CBs #0 to #9 in the initially-transmitted TB, and transmits a NACK for each of CBs #0 to #9 (failed CBs).

Furthermore, referring to FIGS. 5A and 5B, in response to the NACKs for CBs #0 to #9, the radio base station retransmits data including CBs #0 to #9. The DCI to schedule the data including CBs #0 to #9 may include the CB indices of CBs #0 to #9 to be retransmitted, in addition to the HPN assigned to the data. Note that data including retransmitting CBs (here, CBs #0 to #9) or CBGs may be referred to as "TB," "retransmission TB," "retransmission data," and the like.

FIG. 5A shows a case where the DCI scheduling data including CBs #0 to #9 to be retransmitted includes an RV field that is common to all CBs in the TB. For example, in FIG. 5A, a single RV field is included in the DCI, and the value "00" of this RV field (RV field value) indicates RV 0, which is applied to all of retransmitting CBs #0 to #9 in the TB.

FIG. 5B shows a case where DCI that schedules data including CBs #0 to #9 to be retransmitted includes an RV field for each CB in the TB. For example, in FIG. 5B, ten RV fields are included in this DCI, these ten RV field values may indicate the RVs that are applied to retransmitting CBs #0 to #9, respectively. Here, the RV field value "00," which corresponds to CBs #0 and #1, indicates RV 0, the RV field value "10," which corresponds to CBs #2 to #6, indicates RV 2, and the RV field value "11," which corresponds to CBs #7 to #9, indicates RV 3.

<<Single Layer>>

FIG. 6 are diagrams to show examples of first CB/CBG retransmission according to the first aspect. Cases will be described with reference to FIGS. 6A to 6D where a single TB of a single layer is transmitted. For example, FIGS. 6A to 6D assume that the user terminal fails to decode part of all CBs #0 to #9 in the initially-transmitted TB, namely CBs #0, #1, #5 and #6, transmits a NACK for each of CBs #0, #1, #5 and #6.

Also, in response to the NACKs for CBs #0, #1, #5 and #6, the radio base station retransmits data including CBs #0, #1, #5 and #6. At the time of the initial transmission, a TTI (which is, for example, 1 ms) is assigned to the TB including CBs #0 to #9. As shown in FIG. 6A, when the number of retransmitting CBs (here, four) is smaller than the total number of CBs (here, ten) in one TB of the initial transmission, if one TTI of the same time duration as that used in the initial transmission is assigned based on the same signal generation method as that used in the initial transmission (for example, at least one of the same coding rate, the same modulation scheme and the same RV), unused resources may be produced in this one TTI.

Therefore, as shown in FIG. 6B, when retransmitting CBs using a TTI of the same numerology and the same time duration as that used in the initial transmission, the coding rate of at least one of the CBs that are retransmitted may be reduced compared to the initial transmission following predetermined rules.

For example, in FIG. 6B, CBs #0 and #1 are encoded using a coding rate that is ⅓ of that of the initial transmission, retransmitting CBs #5 and #6 are encoded using a coding rate which is ½ of that of the initial transmission. in this way, in FIG. 6B, depending on the number of CBs to be retransmitted, the coding rate of at least one of the CBs that are retransmitted may be controlled.

As shown in FIG. 6B, by reducing the coding rate of at least one CB that is retransmitted, all the resources in one TTI of the same time duration as that used in the initial transmission can be used effectively, and the possibility of successfully decoding CBs that are retransmitted can be improved.

Alternatively, as shown in FIGS. 6C and 6D, when CBs are retransmitted using a TTI of the same numerology and the same time duration as that used in the initial transmission, at least one of the CBs that are retransmitted may be repeated following predetermined rules. To be more specific, as shown in FIG. 6C, at least one of the CBs that are retransmitted may be repeated per RV. For example, in FIG. 6C, at least one of CBs #0, #1, #5, and #6 that are retransmitted is repeated with different RVs 0, 2 and 3.

Alternatively, as shown in FIG. 6D, every CB that is retransmitted may be repeated a predetermined number of times, and different RVs may be applied to the same CB. In FIG. 6D, CBs #0, #1, #5 and #6 are repeated three times, three times, twice and twice, respectively, and different RVs are applied to the same CB per retransmission.

As shown in FIGS. 6C and 6D, by repeating at least one CB that is retransmitted, all the resources in one TTI of the same time duration as that used in the initial transmission can be used effectively, and the possibility of successfully decoding CBs that are retransmitted can be improved.

<<Multiple Layers>>

FIG. 7 are diagrams to show other examples of first CB/CBG retransmission according to the first aspect. With FIGS. 7A to 7E, cases where a plurality of TBs of different layers are transmitted by way of space multiplexing (MIMO: Multiple-Input and Multiple-Output) will be described. For example, FIGS. 7A to 7E assume that the number of layers (rank) is two, but the number of layers is not limited to this.

Figure 7A:
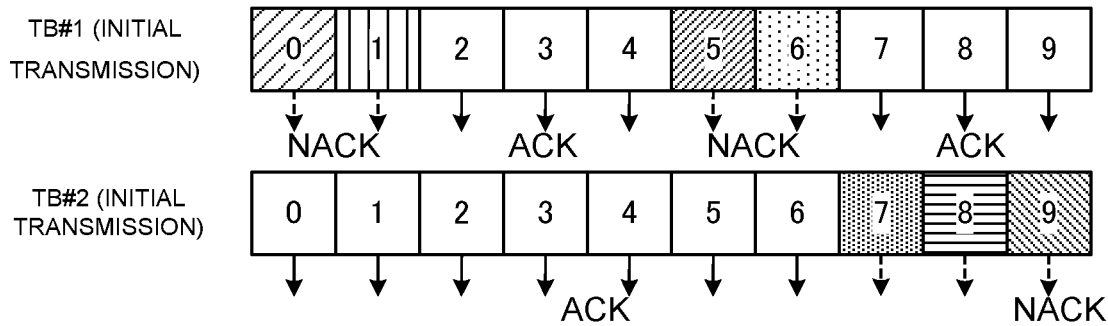
FIGS. 7A to 7E are diagrams to show other examples of first CB/CBG retransmission according to the first aspect.

To be more specific, as shown in FIG. 7A, TB (TB #1) of layer 1 and TB (TB #2) of layer 2 may be transmitted to a single user terminal by way of space multiplexing (single-user MIMO). For example, in FIG. 7A, the user terminal fails to decode CBs #0, #1, #5 and #6 in TB #1, and CBs #7 to #9 in TB #2, that are initially transmitted by way of space multiplexing, and transmits a NACK for each of CBs #0, #1, #5 and #6 in TB #1 and CBs #7 to #9 in TB #2. Hereinafter, differences from FIG. 6 will be mainly described.

Figure 7B:
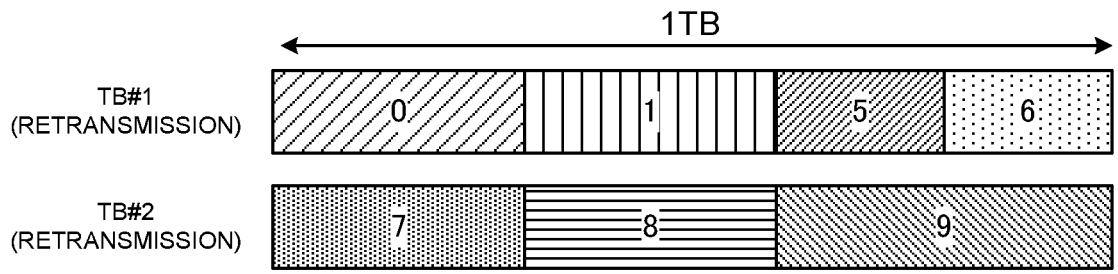
Figure 7C:
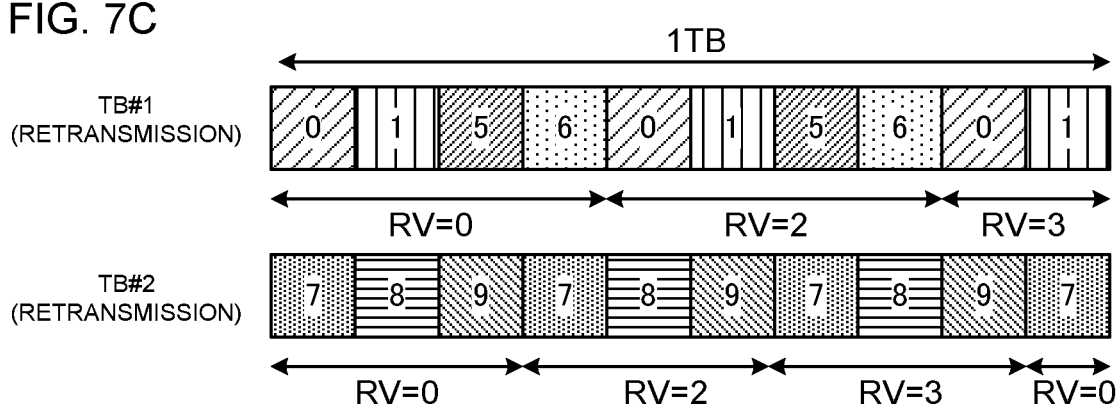

As shown in FIG. 7A, when TBs #1 and #2 of different layers are transmitted to a single user terminal by way of space multiplexing, as shown in FIGS. 7B and 7C, the radio base station may control retransmission of CBs independently for each layer (TB). For example, in FIGS. 7B and 7C, the radio base station may retransmit data #1, which includes CBs #0, #1, #5, and #6 of layer 1, and data #2, which includes CBs #7 to #9 of layer 2, by way of space multiplexing.

As shown in FIG. 7B, one or more CBs of each layer may be encoded at a lower (smaller) coding rate than the initial transmission. For example, in FIG. 7B, CBs #0, #1, #5, and #6 in TB #1 are encoded using a lower coding rate from that used in the initial transmission, as illustrated in FIG. 6B. A coding rate which is ⅓ of the initial transmission is applied to CBs #7 and #8 in TB #2, a coding rate that is ¼ of the initial transmission may be applied to CB #9. In this way, in FIG. 7B, the coding rate of CB that are retransmitted in each layer may be controlled depending on the number of retransmitting CBs per layer.

Also, as shown in FIG. 7C, one or more CBs of each layer may be repeated. To be more specific, as shown in FIG. 7C, at least one of CBs that are retransmitted on a per layer basis may be repeated per RV. For example, in FIG. 7C, at least one of CBs #0, #1, #5 and #6 retransmitted in layer 1 is repeated with different RVs 0, 2 and 3 (note that RVs 0, 2 and 3 may be circulated), as in FIG. 6C. At least one of CBs #7 to #9 retransmitted in layer 2 is repeated with different RVs 0, 2 and 3. In this way, in FIG. 7C, depending on the number of CBs that are retransmitted per layer, the number of repetitions of CBs retransmitted in each layer may be controlled.

Figure 7D:
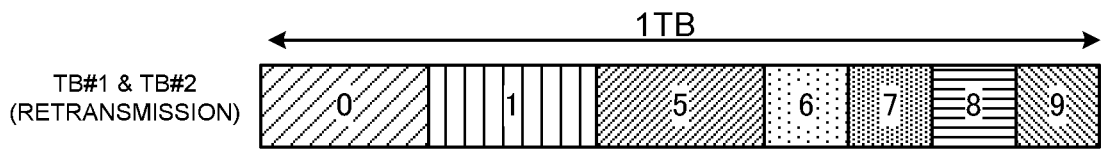
Figure 7E:
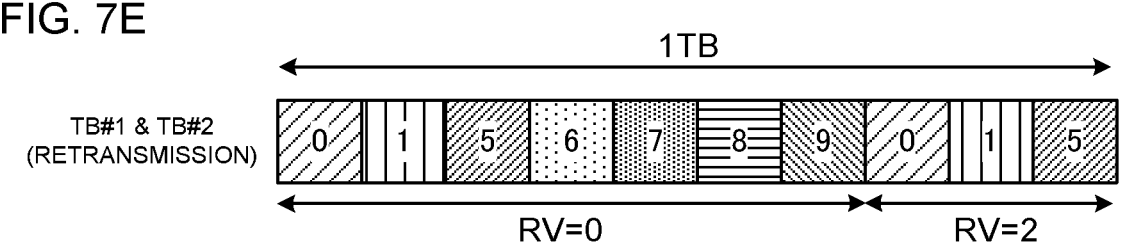

Alternatively, as shown in FIG. 7A, when TBs #1 and #2 of different layers are space-multiplexed and transmitted to a single user terminal, as shown in FIGS. 7D and 7E, the radio base station may control retransmission of CBs in common between layers (TBs). For example, in FIGS. 7D and 7E, the radio base station retransmits CBs #0, #1, #5 and #6 of layer 1 and CBs #7 to #9 of layer 2 in a single layer (TB).

As shown in FIG. 7D, one or more CBs of different layers may be encoded at a lower (smaller) coding rate than the initial transmission. For example, in FIG. 7D, CBs #0, #1 and #5 of layer 1 are encoded using a coding rate that is ½ that of the initial transmission, CB #6 of layer 1 and CBs #7 to #9 of layer 2 are encoded using the same coding rate as the initial transmission. In this way, in FIG. 7D, the coding rate of each CB may be controlled depending on the number of CBs retransmitted in the whole of the plurality of layers.

Also, as shown in FIG. 7E, one or more CBs of different layers may be repeated. For example, in FIG. 7E, one or more CBs are repeated for each RV. For example, in FIG. 7E, the retransmissions CBs #0 and #1 and #5 of layer 1 of RV 2 are repeated after retransmitting CBs #0, #1, #5 and #6 of layer 1 of RV 0 and retransmissions CBs #7 to #9 of layer 2. In this way, in FIG. 7E, depending on the number of CBs retransmitted across multiple layers, the number of repetitions of each CB may be controlled.

Although not shown, in FIGS. 7C and 7E, as described in FIG. 6D, a predetermined number of repetitions are performed for each CB, and different RVs may be applied to the same repeated CB.

As described above, in the first CB/CBG retransmission, since the CB (or CBG) is retransmitted using the TTI of the same time duration as that used in the initial transmission, scheduling at the radio base station and/or receiving process at the user terminal can be performed easily.

<Second CB/CBG Retransmission>

In second CB/CBG retransmission, a CB where a NACK is indicated (also referred to a CBs where decoding has failed, a CB where an error has been detected, etc.) or the CBG that including this CB, is retransmitted by using a TTI having the same numerology as and a different time duration than the initial transmission. The second CB/CBG retransmission is different from the first CB/CBG retransmission in that TTIs of different time durations than the initial transmission are used to retransmit CBs or CBGs. Below, parts that are the same as in the first CB/CBG retransmission will not be described, and the differences will be primarily described.

The time duration of a TTI that is used to retransmission CBs or CBGs may be explicitly specified by a predetermined field value in DCI, or may be specified implicitly based on this DCI. For example, in the event of implicit specification, if DCI to schedule a retransmitting CB or a retransmitting CBG is detected in a control channel for minislots (also referred to as "sTTIs," "short TTIs," etc.), the retransmitting CB or retransmitting CBG may be transmitted in a minislot (also referred as an "sTTI," a "short TTI," etc.). Alternatively, the time duration of this TTI may be configured by higher layer signaling.

Referring to FIG. 8 to FIG. 9, the second CB/CBG retransmission will be described in detail. In FIG. 8 to FIG. 9, retransmission is performed in units of CBs, but this is by no means limiting, and it is possible to appropriately carry out retransmission in CBG units.

<<Single Layer>>

Figure 8A:
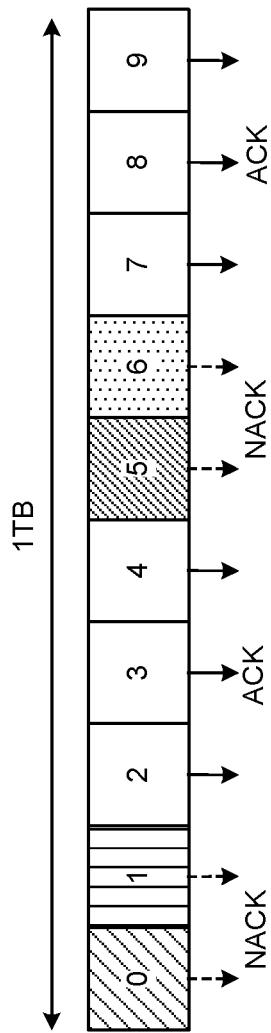
FIGS. 8A to 8C are diagrams to show examples of second CB/CBG retransmission according to the first aspect.
Figure 8B:
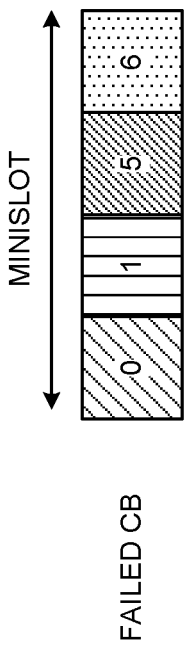
Figure 8C:
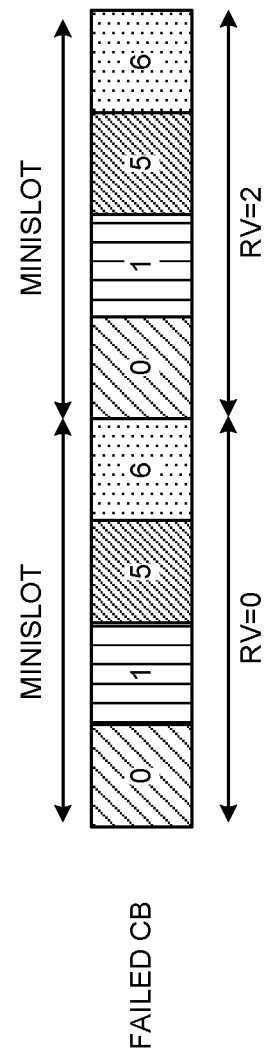

FIG. 8 provide diagrams to show examples of second CB/CBG retransmission according to the first aspect. In FIGS. 8A to 8C, cases will be described where a single TB of a single layer is transmitted. For example, FIGS. 8A to 8C assume that the user terminal fails to decode some of CBs #0, #1 #5 and #6 among all CBs #0 to #9 in the initially-transmitted TB, and transmit a NACK for each of CBs #0, #1, #5 and #6 respectively.

In this case, as shown in FIG. 8B, in response to NACK from the user terminal, the radio base station may retransmit CBs #0, #1 #5 and #6 using a TTI of a time duration different from that of the time of initial transmission. For example, in FIG. 8B, CBs #0, #1 #5 and #6 are generated based on the same signal generation method as the initial transmission (for example, at least one of the same coding rate, the same modulation scheme and the same RV), and transmitted in a TTI that is shorter than that of the initial transmission (also referred to as a "minislot," a "short TTI," etc.).

Also, as shown in FIG. 8C, the radio base station may repeat and retransmit CBs #0, #1, #5, and #6 a predetermined number of times, by using a TTI having a shorter time duration from that used in the initial transmission. For example, in FIG. 8C, two of the minislots of FIG. 8B are concatenated, and CBs #0, #1, #5, and #6 are repeated twice. As shown in FIG. 8C, different RVs may be applied to CBs #0, #1, #5, and #6 for each repetition.

As shown in FIGS. 8B and 8C, by using a TTI with a shorter time duration from that used in the initial transmission, the processing time pertaining to receiving processes for retransmitted CBs in the user terminal can be shortened, and the latency time can be shortened. In addition, the efficiency of the use of resources in the time direction can be improved.

<<Multiple Layers>>

Figure 9A:
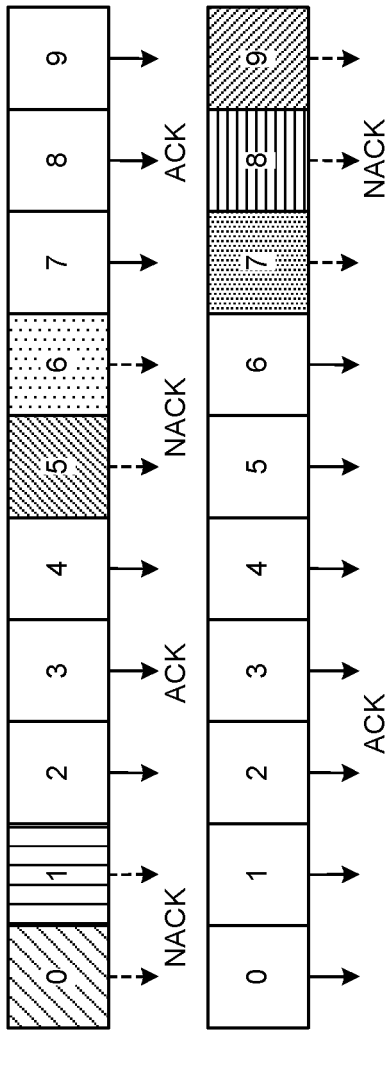
FIGS. 9A to 9C are diagrams to show other examples of second CB/CBG retransmission according to the first aspect.
Figure 9B:
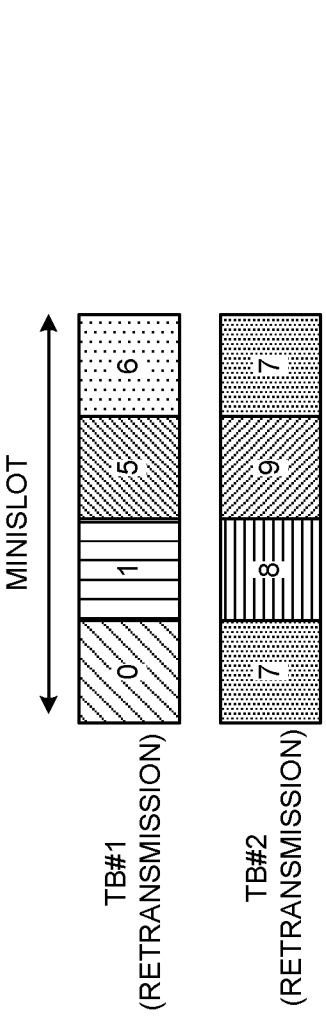
Figure 9C:
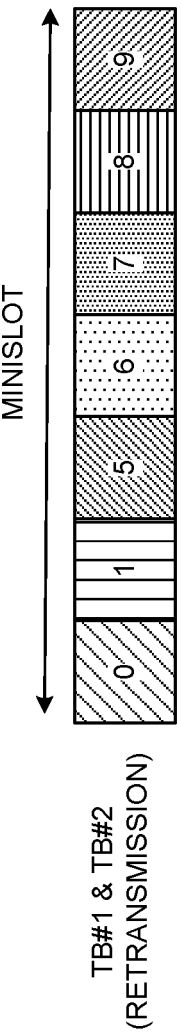

FIG. 9 are diagrams to show other examples of the second CB/CBG retransmission according to the first aspect. With FIGS. 9A to 9C, cases will be described where a plurality of TBs of different layers are transmitted by way of space multiplexing (MIMO). For example, FIGS. 9A to 9C assume cases where the number of layers (rank) is two, but the number of layers is not limited to this. Since FIG. 9A is the same as FIG. 7A, the explanation will be omitted.

As shown in FIG. 9A, when TBs #1 and #2 of different layers are transmitted to a single user terminal by way of space multiplexing, as shown in FIG. 9B, the radio base station may control retransmission of CBs independently for each layer (TB). For example, in FIG. 9B, the radio base station space multiplexes TB #1 including CBs #0, #1, #5 and #6 of layer 1 and retransmitting TB #2 including CBs #7 to #9 of layer 2, and retransmit these in a TTI of a different time duration than the initial transmission.

As shown in FIG. 9B, the radio base station may retransmit TBs including CBs of independent layers by using TTIs having common a time duration common between the layers. For example, in FIG. 9B, TB #1 of layer 1 and TB #2 of layer 2 are space-multiplexed in TTIs (for example, minislots) of the same time duration, which is shorter from that used in the initial transmission. TB #1 of layer 1 includes retransmitting CBs #0, #1, #5, and #6. TB #2 of layer 2 includes retransmitting CBs #7 to #9, and retransmitting CB #7 is repeated.

In this way, when the retransmission CB is transmitted independently for each layer, one or more retransmitting CBs of at least one layer may be repeated in order to use TTIs of the same time duration between the layers. Also, for each retransmission CB, a different RV may be applied every time it is repeated.

Meanwhile, as shown in FIG. 9C, the radio base station may control retransmission of CBs in common between layers (TBs). For example, in FIG. 9C, the radio base station transmits a single retransmission TB including retransmitting CBs #0, #1, #5 and #6 of layer 1 and retransmitting CBs #7 to #9 of layer 2, in a TTI that is shorter from that used in the initial transmission.

As described above, in the second CB/CBG retransmission, since CBs (or CBGs) are retransmitted using TTIs of different time durations than the initial transmission, the processing time pertaining to receiving processes for retransmitted CBs (retransmitted CBGs) can be shortened, and the latency time can be shortened.

<Third CB/CBG Retransmission>

According to third CB/CBG retransmission, a CB or a CBG to be retransmitted (retransmitting CB/CBG) may be bundled and transmitted with a TB that is transmitted initially (initial transmission TB) in a different HPN from that of the retransmitting CB/CBG (that is, multiplexed on a scheduled data channel), and/or bundled and transmitted with a retransmitting CB/CBG in a different HPN from that of the retransmitting CB/CBG (that is, multiplexed on a scheduled data channel). A retransmitting CB/CBG and an initial transmission TB that are bundled, and retransmitting CBs/CBGs of different HPNs that are bundled, may be transmitted using the same numerology as that used in the initial transmission and using a TTI of a time duration that is the same as or different form that of the initial transmission.

In the third CB/CBG retransmission, DCI that schedules a DL signal may include one or more HPN fields (also simply referred to as "HPN"). The number $x$ ($X \geq 1$) of HPN fields included in DCI may be configured by higher layer signaling and/or physical layer signaling, or may be determined in advance by the specification. For example, in the case of x=2, retransmitting CBs/CBGs of two HPNs may be bundled and transmitted.

Also, in the third CB/CBG retransmission, based on the number x of HPN fields, at least one of the number of RV fields, the number of NDI fields and the number of fields indicating CB information or CBG information (for example, CB index fields or CBG index fields) may be determined. For example, when x=2, at least one of the number of RV fields, the number of NDI fields and the number of CB (or CBG) index fields may be two. In this case, RVs, NDIs, and retransmission of CBs can be performed independently for each HPN, so that more flexible retransmission control becomes possible.

Also, according to the third CB/CBG retransmission, at least one of the modulation and coding scheme (MCS), resource allocation fields, the demodulation reference signal (DMRS), and others may be shared in common among CBs (or CBGs) of different HPNs that are bundled.

Also, in the third CB/CBG retransmission, the order of CBs of different HPNs to be bundled may be determined according to predetermined rules. For example, a CB (or CBG) of a smaller HPN may come earlier than a CB (or CBG) of a larger HPN (rule 1). Furthermore, a retransmitting CB (or CBG) may come earlier than an initial transmission CB (or CBG) in a different HPN (rule 2). In rule 2, when all retransmitting CBs (or CBG) are transmitted, rule 1 may be applied.

With reference to FIG. 10, the third CB/CBG retransmission will be described in detail. Note that, in FIG. 10, it is assumed that retransmission is performed in units of CBs, but this is by no means limiting, retransmission can be carried out in units of CBGs as well. FIG. 10 provide diagrams to show examples of third CB/CBG retransmission according to the first aspect. With FIG. 10A, a case will be described where multiple TBs of different HPNs are transmitted in different TTIs of a single layer.

For example, FIG. 10A assumes that the user terminal fails to decode some of the CBs #0, #1, #5, and #6 in an initially-transmitted TB in HPN=0, and transmit a NACK for each of CBs #0, #1, #5 and #6. In addition, the user terminal fails to decode some of CBs #7 to #9 in the initially-transmitted TB in HPN=2, and transmits a NACK for each of CBs #7 to #9.

In this case, as shown in FIG. 10B, the radio base station may transmit a retransmitting CB in response to a NACK from the user terminal by bundling it with a new TB of HPN different from the retransmitting CB. For example, in FIG.

10B, new TBs including retransmitting CBs #0, #1, #5 and #6 of HPN=0 and new CBs #0 to #5 in HPN=1 are bundled and transmitted.

As shown in FIG. 10B, if the total number of CBs (here, ten) that are bundled is the same as when the initial transmission was made, a TTI of the same time duration as that used in the initial transmission may be used to transmit retransmitting CBs and a new TB that are bundled.

Alternatively, as shown in FIG. 10C, the radio base station may transmit a retransmitting CB in response to a NACK from the user terminal by bundling it with a retransmitting CB of a different HPN from the retransmitting CB. For example, in FIG. 10C, retransmitting CBs #0, #1, #5 and #6 of HPN=0 and retransmitting CBs #7 to #9 of HPN=2 are bundled and transmitted.

As shown in FIG. 10C, when the total number of CBs (here, 7) that are bundled is different than the initial transmission, a TTI of a different time duration than the initial transmission may be used to transmit the retransmitting CBs that are bundled. Note that a time duration that is different from the time of the initial transmission may be explicitly specified by a predetermined field value in DCI as described with the second CB/CBG retransmission, or may be designated implicitly based on this DCI.

In the third CB/CBG retransmission, a retransmitting CB/CBG is bundled and transmitted with a new TB of a different HPN from that of the retransmitting CB/CBG, or bundled with a retransmitting CB/CBG of a different HPN from that of the retransmitting CB/CBG and transmitted, so that more efficient transmission of retransmitting CBs or retransmitting CBGs is made possible.

According to first aspect described above, the same subcarrier spacing as that used in the initial transmission is used for transmission of retransmitting CBs/CBGs, so that, even a user terminal supports only a single numerology, retransmission control can be executed appropriately in units of CBs or CBGs.

(Second Aspect)

According to a second aspect of the present invention, a CB where a NACK is indicated (also referred to as a CB where decoding has failed, a CB where an error has been detected, etc.) or the CBG including this CB, is retransmitted by using a different numerology than the initial transmission. The second aspect is different from the first aspect in that a different numerology is used for retransmission of CBs or CBGs from that used in the initial transmission. Differences from the first aspect will be primarily described below.

In a second aspect, the numerology used for retransmission of CBs or CBGs may be explicitly specified by a predetermined field value in DCI. The numerology of this DCI may be determined on a fixed basis or may be configured by higher layer signaling.

alternatively, the numerology for use for retransmitting CBs or CBGs may be implicitly specified based on the DCI. For example, in implicit specification, the same numerology as retransmission of CBs or CBGs may be applied to the DCI.

In a second aspect, the first to third CB/CBG retransmissions described above can be performed using different numerologies. For example, when applying the first CB/CBG retransmission to the second aspect, CBs or CBGs may be retransmitted using a different numerology from the initial transmission and using a TTI of the same time duration as that used in the initial transmission. For example, when retransmitting CBs or retransmitting CBGs are transmitted using a different subcarrier spacing than the initial transmission, the number of symbols within a TTI of the same time duration as that used in the initial transmission may be different from that used upon the initial transmission.

Furthermore, when the second CB/CBG retransmission is applied to the second aspect, CBs or CBGs may be retransmitted using a different numerology than the initial transmission and TTI having a different time duration than the initial transmission. For example, when CBs or CBGs are retransmitted using a different subcarrier spacing than the initial transmission, the number of symbols in a TTI having a different time duration than the initial transmission may be the same as the initial transmission.

Furthermore, when the third CB/CBG retransmission is applied to the second aspect, different HPN bundled retransmitting CB/CBG and new TB and and/or different HPN bundled retransmitting CB/CBG may be transmitted using a different numerology than the initial transmission and a TTI having the same time duration or a different time duration as or from that used in the initial transmission.

In the above second aspect, since a different subcarrier spacing than the initial transmission is used to retransmit CBs or CBGs, a user terminal that supports one or more numerologies can appropriately perform retransmission control in units of CBs or CBGs.

(Third Aspect)

With a third aspect of the present invention, the unit of scheduling in the first and/or the second aspect will be described. In the first and/or the second aspect, DL signals are scheduled in units of TBs (level), but DL signals may be scheduled in CB units (level) or CBG units (level).

<Scheduling in TB Units>

When scheduling is performed in TB units, DCI that schedules a given TB (for example, one TB for a single layer, multiple TBs for multiple layers) may include information to indicate the TBS of the TB (for example, MCS index and the number of PRBs allocated), a single HPN field value indicating the HPN assigned to the TB, CB information to indicate each CB in the TB (for example, one or more CBG indices) or CBG information to indicate each CBG in the TB (for example, one or more CBG indices).

Furthermore, the DCI to schedule this TB may include a single RV field value that is common to all CBs in the TB, or an RV field value for each CB or CBG in the TB.

Furthermore, scheduling in units of TBs may be performed for each slot (also referred to as "TTI" etc.) or every multiple slots. The user terminal may monitor (blind decoding) the DCI to schedule this TB for each slot or for each of the plurality of slots and detect the DCI for that user terminal.

<Scheduling in CB/CBG Units>

When scheduling is performed in CB units or CBG units, DCI that schedules a given CB (one CB for a single layer, multiple CB for multiple layers) or CBG (one CB for a single layer, multiple CB for multiple layers) may include the TBS including the CB or CBG and/or the size of the CB or CBG.

The DCI scheduling the CB or the CBG may include the RV field value to be applied to the CB or the CBG.

Scheduling of CB units or CBG units may be performed for each minislot (also referred to as "short TTI" etc.) or for each of a plurality of minislots. The user terminal may monitor (blind decoding) the DCI scheduling CB or CBG either for each minislot, for each of a plurality of minislots, or for each slot, and may detect the DCI for the user terminal.

Also, according to the third aspect, the unit of scheduling may be changed between the initial transmission and retransmissions. For example, when scheduling of initial transmission is performed in CB or CBG units, scheduling of retransmission may be performed in TB units (that is a TB including a retransmission CB or a retransmission CBG may be scheduled). Alternatively, if scheduling of initial transmission is performed in TB units, scheduling of retransmission may be performed in CB or CBG units (that is, retransmitting CBs or retransmitting CBGs may be scheduled on an as-is basis).

According to the third aspect, since the unit of scheduling is controlled, the user terminal can more appropriately perform retransmission control in units of CBs or CBGs.

(Other Aspects)

In the above first to third aspects, although retransmission of DL signals in CB or CBG units has been described, retransmission in CB or CBG units according to the first to third aspect may be applied to the UL signal.

<Scheduling in TB Units>

When scheduling is performed in TB units, the user terminal receives DCI (UL grant) that schedules a TB to which a particular HPN is assigned. Based on the UL grant, the user terminal transmits a TB including one or more CBs or CBGs.

If decoding of one or more CBs or CBGs in the TB fails, the radio base station transmits a UL grant that schedules a CB or a CBG where decoding has failed. The user terminal retransmits the CB or CBG specified by the UL grant.

A UL grant to schedule a CB or CBG where decoding has failed may include information to indicate the TBS of the retransmitting TB including the CB or CBG (for example, MCS index and the number of PRBs allocated), a single HPN field value indicating the HPN assigned to the retransmitting TB, CB information to indicate retransmitting CBs in the retransmitting TB (for example, one or more CB indices), or CBG information to indicate one or more retransmitting CBGs in the retransmitting TB (for example, one or more CBG indices). Also, non-toggled NDIs may be contained.

Furthermore, the DCI scheduling the retransmitting TB may include a single RV field value that is common to all CBs in the retransmitting TB, or RV field values that are specific to every CB or CBG in the retransmitting TB.

<Scheduling in CB/CBG Units>

When scheduling is performed in CB/CBG units, the user terminal receives DCI (UL grant) that schedules a CB or a CBG to which a specific HPN is assigned. The user terminal transmits the CB or the CBG specified by the UL grant.

If decoding of a CB or a CBG fails, the radio base station transmits a UL grant that schedules the CB or the CBG that has failed to be decoded. The user terminal retransmits the CB or the CBG specified by the UL grant.

A UL grant to schedule a CB or a CBG that has failed to be decoded may include the size of the TBS including the CBs or CBGs and/or the size of the CBs or CBGs. The DCI scheduling the CB or the CBG may include the RV field value to be applied to the CB or the CBG. Also non-toggled NDIs may be contained.

According to other aspects, retransmission of UL signals in CB or CBG units can be executed appropriately.

(Radio Communication System)

Now, the structure of a radio communication system according to the present embodiment will be described below. In this radio communication system, each radio communication method according to the above-described embodiments is employed. Note that the radio communication method according to each embodiment may be used alone or may be used in combination.

Figure 11:
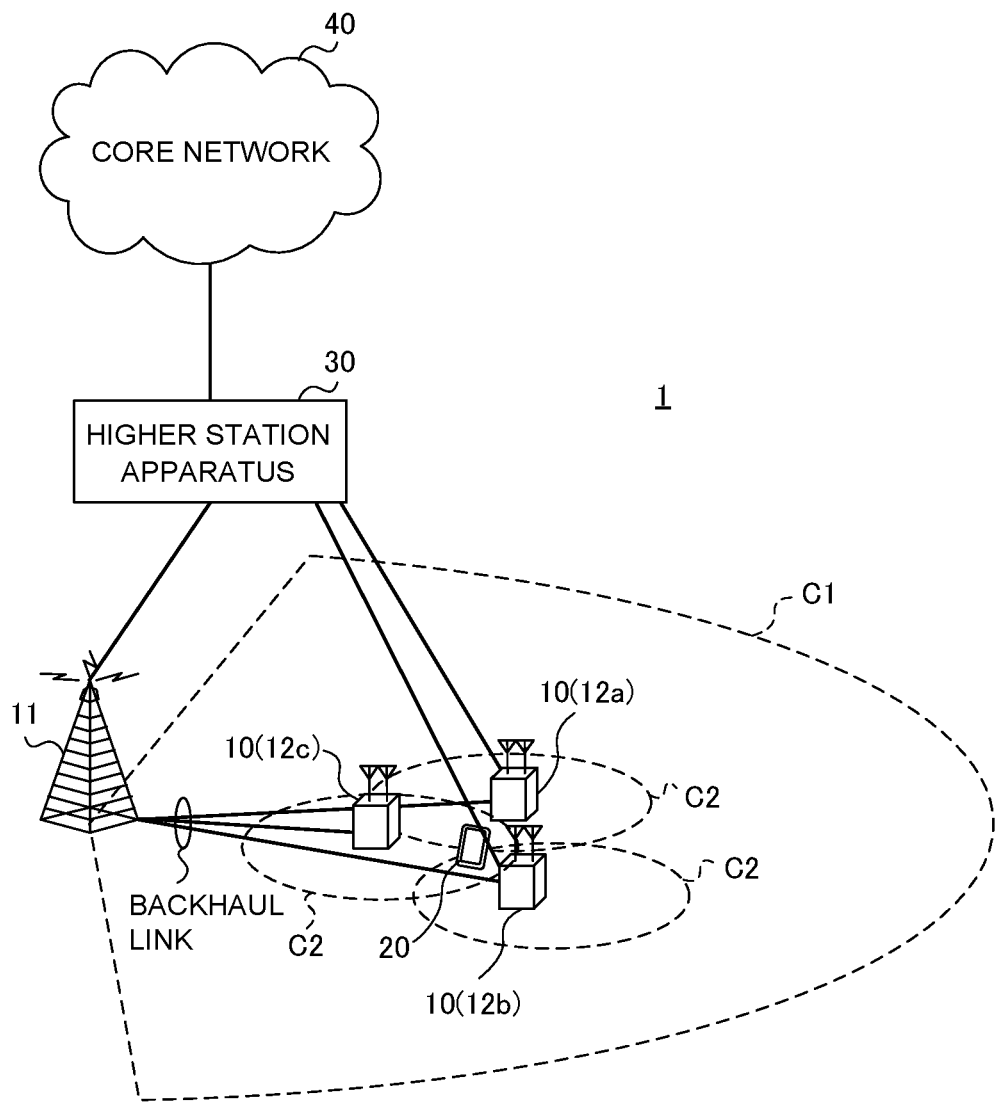
FIG. 11 is a diagram to show an example of a schematic structure of a radio communication system according to the present embodiment.

FIG. 11 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 11 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. A configuration in which different numerologies are applied between cells may be adopted. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

In each cell (carrier), either one of a subframe having a relatively long time duration (also referred to as a "TTI," a "normal TTI," a "long TTI," a "normal subframe," a "long subframe," a "slot," etc.) (for example, 1 ms), or a subframe having a relatively short time duration (also referred to as a "short TTI," a "short subframe," a "slot," etc.) may be applied, or both long subframes and short subframe may be used. Furthermore, in each cell, subframes of two or more time durations may be applied.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform inter-terminal (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL. SC-FDMA can also be applied a side link (SL) that is used in inter-terminal communication.

In the radio communication system 1, DL data channel (PDSCH (Physical Downlink Shared CHannel), which is also referred to as, for example, a "DL shared channel"), which is used by each user terminal 20 on a shared basis, a broadcast channel (PBCH (Physical Broadcast CHannel)), L1/L2 control channels and so on, are used as DL channels. User data, higher layer control information and SIBs (System Information Blocks) are communicated in the PDSCH. Also, the MIB (Master Information Blocks) is communicated in the PBCH.

The L1/L2 control channels include DL control channels (a PDCCH (Physical Downlink Control CHannel), an EPDCCH (Enhanced Physical Downlink Control CHannel) and so on), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. PUSCH delivery acknowledgment information (A/Ns, HARQ-ACKs, etc.) can be communicated in at least one of the PHICH, the PDCCH and the EPDCCH.

In the radio communication system 1, UL data channel (PUSCH: Physical Uplink Shared CHannel, which is also referred to as "UL shared channel" and so on), which is used by each user terminal 20 on a shared basis, a UL control channel (PUCCH: Physical Uplink Control CHannel), a random access channel (PRACH: Physical Random Access CHannel) and so on are used as UL channels. User data, higher layer control information and so on are communicated by the PUSCH. Uplink control information (UCI), including at least one of PUSCH delivery acknowledgement information (A/Ns, HARQ-ACKs, etc.), channel state information (CSI) and so on, is communicated in the PUSCH or the PUCCH. By means of the PRACH, random access preambles for establishing connections with cells are communicated.

<Radio Base Station>

Figure 12:
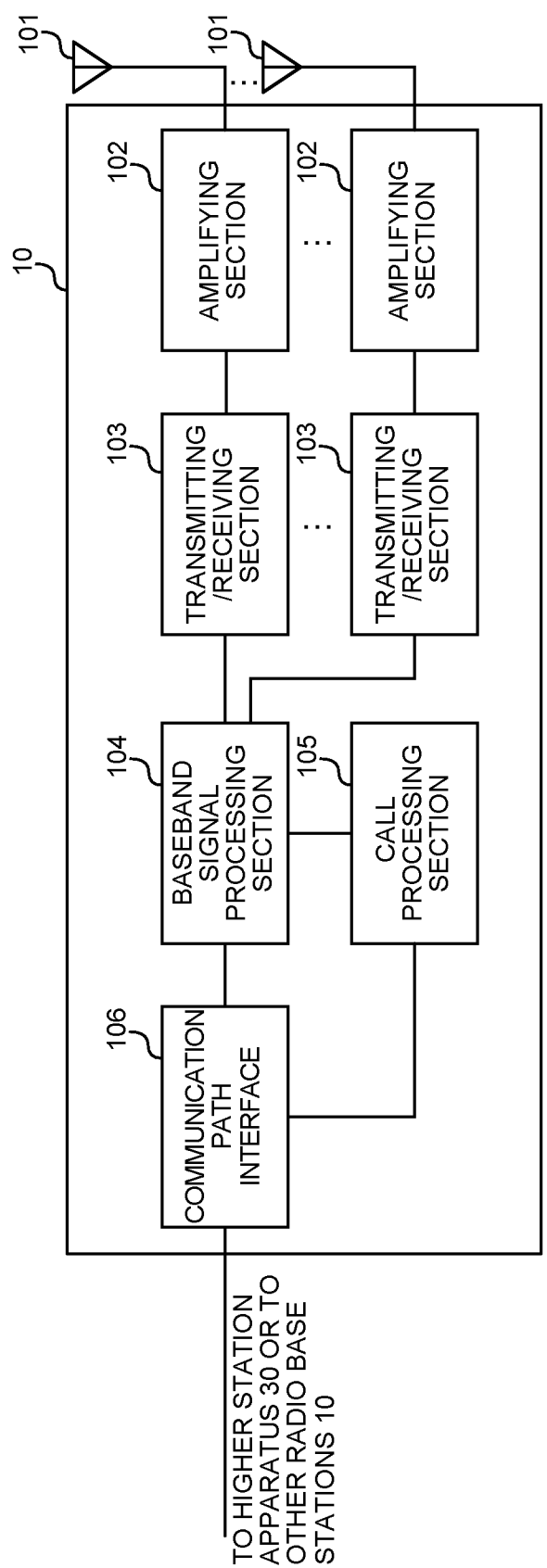
FIG. 12 is a diagram to show an example of an overall structure of a radio base station according to the present embodiment.

FIG. 12 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) process), scheduling, transport format selection, channel coding, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, an interface in compliance with the CPRI (Common Public Radio Interface), such as optical fiber, the X2 interface, etc.).

In addition, the transmitting/receiving sections 103 transmit DL signals (for example, at least one of DCI (DL assignments to schedule DL data and/or UL grants to schedule UL data), DL data, and DL reference signals), and receive UL signals (for example, at least one of UL data, UCI and UL reference signals).

Also, the transmitting/receiving sections 103 receive delivery acknowledgment information (also referred to as "ACKs/NACKs," "A/Ns," "HARQ-ACKs," etc.) for DL signals. These A/Ns may be transmitted in units—for example, in units of CBs, in units of CBGs, etc. Also, the transmitting/receiving sections 103 may transmit configuration information regarding the unit of A/N transmission. In addition, the transmitting/receiving sections 103 may transmit configuration information regarding the retransmission unit of DL signals and/or UL signals.

Figure 13:
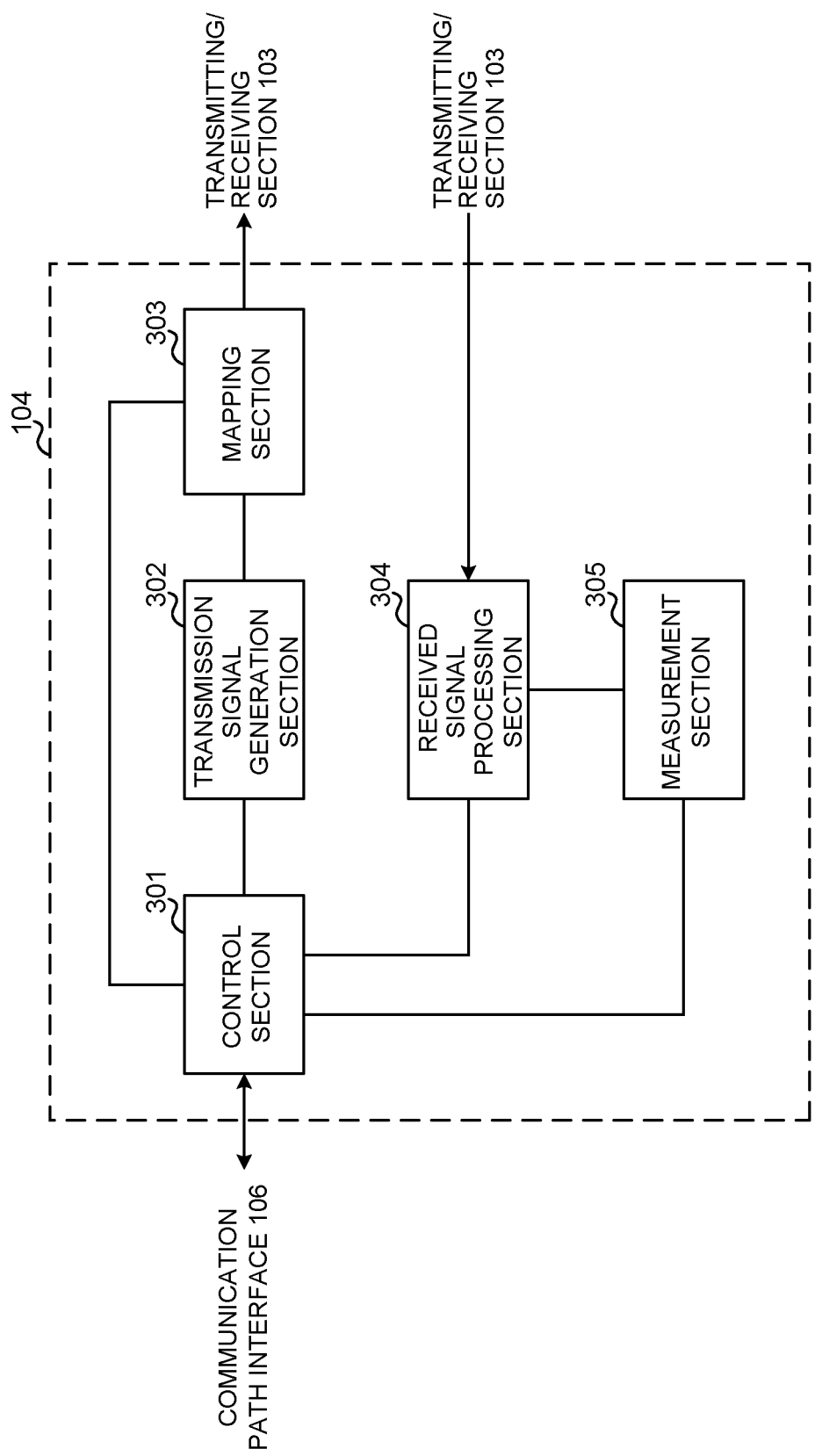
FIG. 13 is a diagram to show an example of a functional structure of a radio base station according to the present embodiment.

FIG. 13 is a diagram to show an example of a functional structure of a radio base station according to one embodiment of the present invention. Note that, although FIG. 13 primarily shows functional blocks that pertain to characteristic parts of the present embodiment, the radio base station 10 has other functional blocks that are necessary for radio communication as well. As shown in FIG. 13, the baseband signal processing section 104 has a control section 301, a transmission signal generation section 302, a mapping section 303, a received signal processing section 304 and a measurement section 305.

The control section 301 controls the whole of the radio base station 10, The control section 301 controls DL signal generation processes by the transmission signal generation section 302 (for example, encoding, modulation, etc.), mapping of DL signals by the mapping section 303, UL signal receiving processes by the received signal processing section 304 (for example, demodulation, decoding, etc.), and measurements by measurement section 305.

To be more specific, the control section 301 determines the modulation scheme and TBS of a DL signal based on a channel quality indicator (CQI) that is fed back from a user terminal 20. The control section 301 controls the transmission signal generating section 302 to encode the DL signal based on the TBS and modulate the DL signal based on the modulation scheme.

Also, when the TBS exceeds a predetermined threshold, the control section 301 may apply code block segmentation to the DL signal, whereby the TBS is divided into multiple CBs. To be more specific, the control section 301 may control the transmission signal generation section 302 to perform encoding and rate matching per CB, and control the mapping section 303 to map a CW, in which each CB is connected. Also, when the TBS exceeds a predetermined threshold, the control section 301 may apply code block segmentation to UL signals.

Also, the control section 301 controls UL signal receiving processes (for example, demodulation, decoding, etc.). For example, the control section 301 may demodulate a UL signal based on a modulation scheme indicated by an MCS index specified in DCI (UL grants), determine the TBS based on the TBS index indicated by the MCS index and the number of allocated resource blocks, and control the received signal processing section 304 to decode DL signal based on this TBS.

Also, the control section 301 controls UL signal receiving processes (for example, demodulation, decoding, etc.). For example, the control section 301 may demodulate a UL signal based on a modulation scheme indicated by an MCS index specified in DCI (UL grants), determine the TBS based on the TBS index indicated by the MCS index and the number of allocated resource blocks, and control the received signal processing section 304 to decode DL signals based on this TBS.

Also, based on A/Ns that are sent from the user terminal 20 on a per CB basis (or on a per CBG basis), the control section 301 may control retransmission of each CB (or each CBG) constituting a DL signal (first aspect). To be more specific, using the same numerology (first aspect) or a different numerology (second aspect) as or from that of the initial transmission, the control section 301 may control the user terminal 20 to transmit CBs or CBGs where a NACK is indicated.

Also, using a TTI having the same time duration as that used in the initial transmission (first CB/CBG retransmission) or a TTI having a different time duration (second CB/CBG retransmission), the control section 301 may control the user terminal 20 to retransmit CBs or CBGs where a NACK is indicated.

Also, when NACKs for a plurality of CBs or a plurality of CBGs of different layers are received, the control section 301 may execute control so that these multiple CBs or multiple CBGs are retransmitted separately per layer or retransmitted in common between layers (FIG. 7 and FIG. 9).

In addition, the control section 301 may execute control so that a CB or a CBG is bundled and transmitted with a TB that is initially transmitted with a different HPN from that of the CB or the CBG, and/or so that a CB or a CBG is bundled and transmitted with a CB or a CBG that is retransmitted with a different HPN from that of the CB or the CBG (third CB/CBG retransmission).

Also, based on the decoding (error correction) result of each CB constituting a UL signal, the control section 301 may control retransmission of each CB (or each CBG) constituting UL signals (other aspects). To be more specific, the control section 301 may exert control so that DCI (UL grants) that schedules a CB that has failed to be decoded or the CBG including this CB is transmitted.

The control section 301 can be constituted by a controller, a control circuit or control apparatus that can be described based on general understanding of the technical field to which the present invention pertains.

Based on a command from the control section 301, transmission signal generation section 302 may generate a DL signal (including at least one of DL data, DCI, a DL reference signal and control information by higher layer signaling), and output this to mapping section 303.

For the transmission signal generation section 302, a signal generator, a signal generation circuit or signal generation apparatus that can be described based on general understanding of the technical field to which the present invention pertains can be used.

The mapping section 303 maps the DL signals generated in the transmission signal generation section 302 to predetermined radio resources based on commands from the control section 301, and outputs these to the transmitting/receiving sections 103. For the mapping section 303, mapper, a mapping circuit or mapping apparatus that can be described based on general understanding of the technical field to which the present invention pertains can be used.

The received signal processing section 304 performs receiving processes (for example, demapping, demodulation, decoding and so on) of uplink signals that are transmitted from the user terminals 20. For example, the received signal processing section 304 may perform the decoding process in CB units, according to commands from the control section 301.

To be more specific, the received signal processing section 304 may output the received signals, the signals after the receiving process and so on, to the measurement section 305. The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, the RSRP (Reference Signal Received Power)), the received quality (for example, RSRQ (Reference Signal Received Quality)), channel states and so on of the received signals. The measurement results may be output to the control section 301.

<User Terminal>

Figure 14:
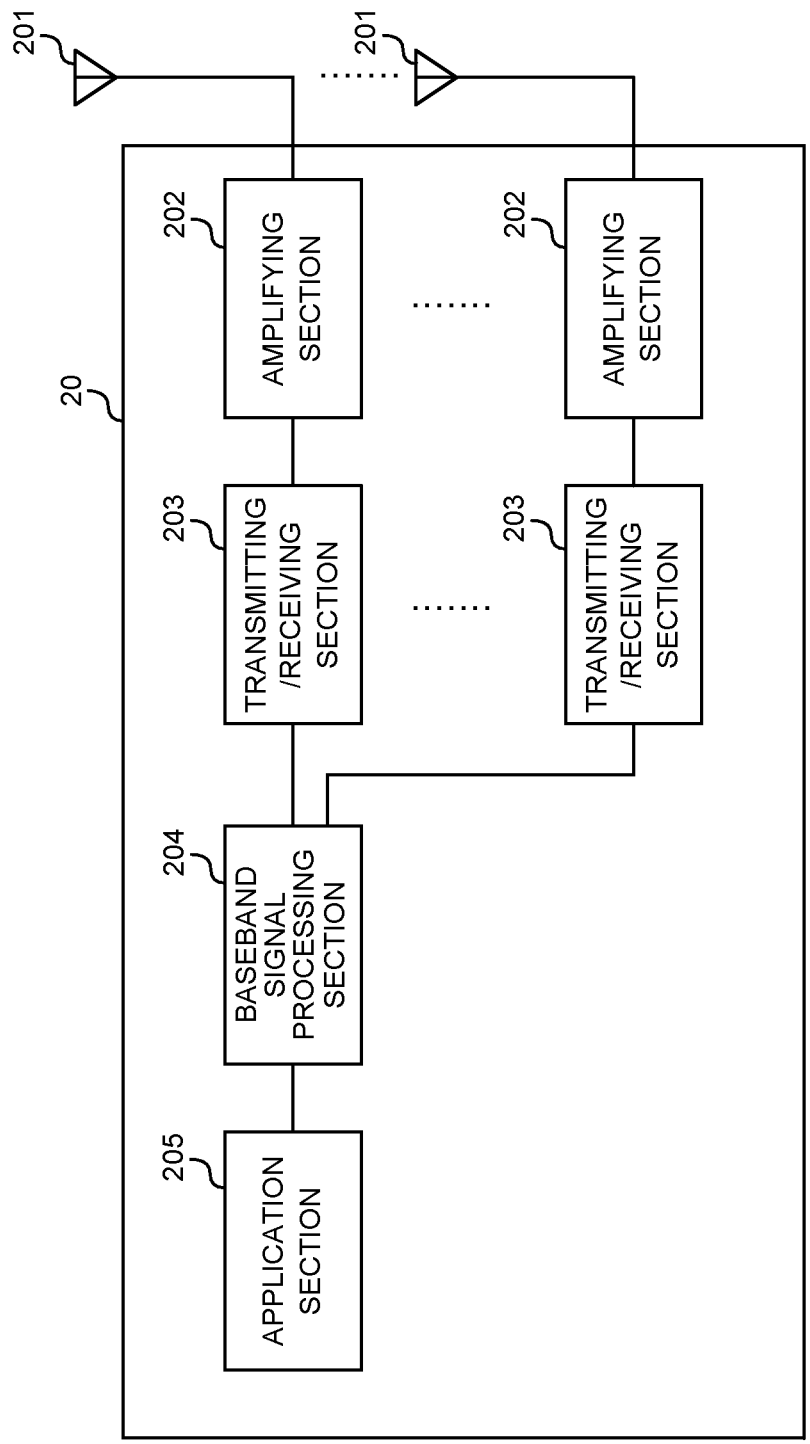
FIG. 14 is a diagram to show an example of an overall structure of a user terminal according to the present embodiment.

FIG. 14 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on.

Meanwhile, the UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. UCI (for example, at least one of A/N for DL signal, channel state information (CSI), scheduling request (SR), etc.) is also subjected to channel coding, rate matching, puncturing, DFT processing, IFFT processing and so on, and forwarded to each transmitting/receiving section 203.

The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

In addition, the transmitting/receiving sections 203 receive DL signals (for example, at least one of DCI (DL assignment and/or UL grant), DL data and DL reference signals), and transmit UL signals (for example, at least one of UL data, UCI and UL reference signals).

In addition, the transmitting/receiving sections 203 transmit A/Ns in response to DL signals. As described above, the unit of transmission of A/Ns may be, for example, per CB or per CBG. In addition, the transmitting/receiving section 203 may receive configuration information regarding the unit of transmission of A/Ns. In addition, the transmitting/receiving sections 203 may receive configuration information of the retransmission unit of the DL signal and/or the UL signal.

For the transmitting/receiving sections 203, transmitters/receivers, transmitting/receiving circuits or transmitting/receiving apparatus that can be described based on general understanding of the technical field to which the present invention pertains can be used. Furthermore, a transmitting/receiving section 203 may be structured as one transmitting/receiving section, or may be formed with a transmitting section and a receiving section.

Figure 15:
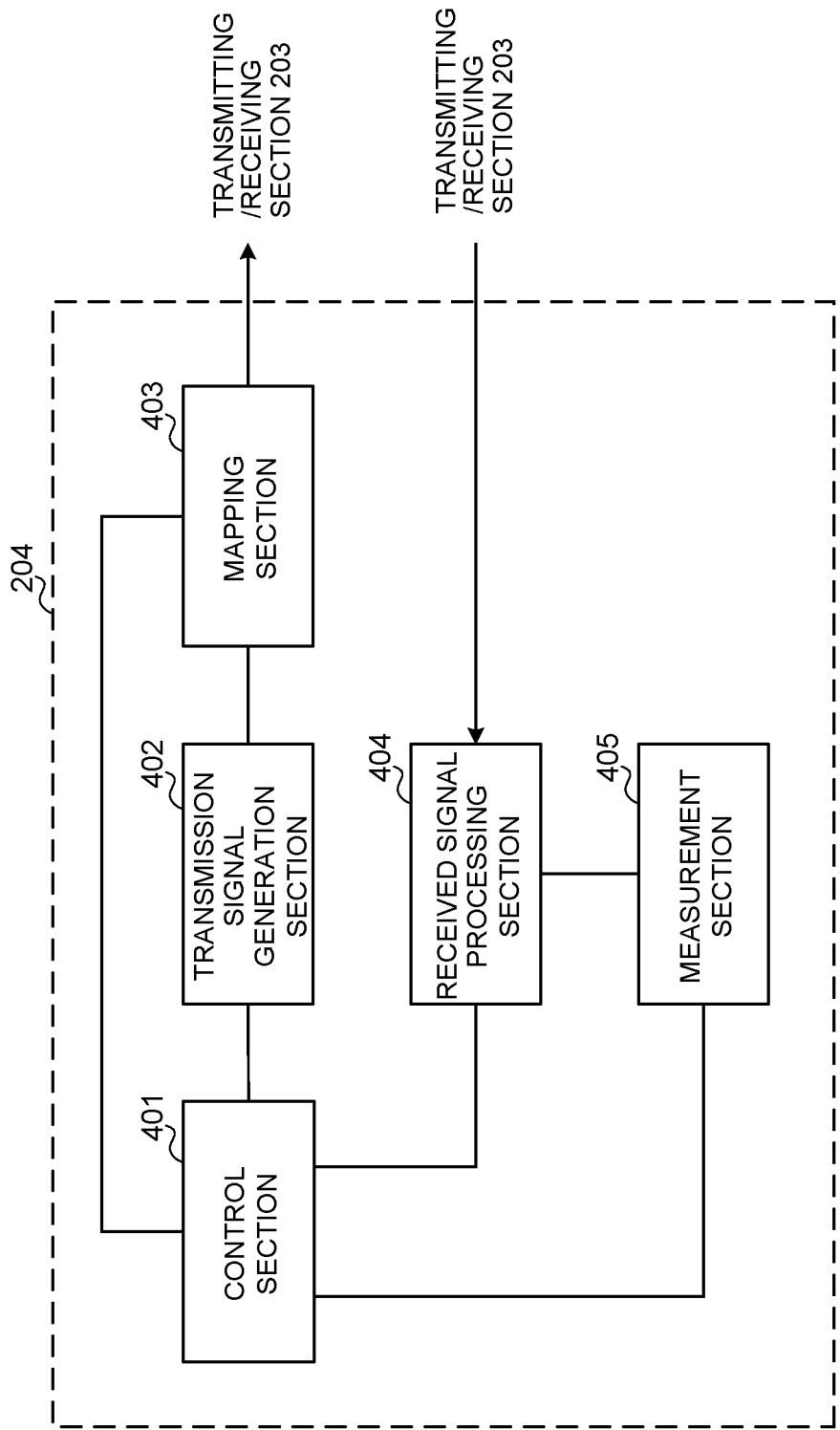
FIG. 15 is a diagram to show an example of a functional structure of a user terminal according to the present embodiment.

FIG. 15 is a diagram to show an example of a functional structure of a user terminal according to one embodiment of the present invention. Note that, although FIG. 15 primarily shows functional blocks that pertain to characteristic parts of the present embodiment, the user terminal 20 has other functional blocks that are necessary for radio communication as well. As shown in FIG. 15, the baseband signal processing section 204 provided in the user terminal 20 has a control section 401, a transmission signal generating section 402, a mapping section 403, a received signal processing section 404 and a measurement section 405.

The control section 401 controls the whole of the user terminal 20. The control section 401 controls, for example, DL signal receiving processes by the received signal processing section 404, UL signal generation processes by the transmission signal generation section 402, mapping of UL signals by the mapping section 403, and measurement by the measurement section 405.

To be more specific, the control section 401 controls receiving processes (for example, demodulation, decoding, etc.) of DL signals based on DCI (DL assignment). For example, based on the modulation scheme indicated by the MCS index in DCI, the control section 401 may control the received signal processing section 404 to demodulate DL signals. Also, the control section 401 may determine the TBS based on the TBS index indicated by the MCS index and the number of allocated resource blocks, and control the received signal processing section 404 to decode DL signals based on the TBS.

Furthermore, the control 401 may control the transmission of A/Ns for DL signals. To be more specific, the control section 401 may control transmission of A/Ns for DL signals in predetermined transmission units (for example, in units of CBs or in units of CBGs). The unit of transmission may be indicated by configuration information from the radio base station 10. For example, based on the decoding (error correction) result of each CB constituting a DL signal, the control section 401 may control transmitting A/Ns per CB or per CBG.

Also, the control section 401 may control restoration of TBs constituting DL signals. To be more specific, based on the CB or CBG initially transmitted and/or retransmitted CBs/CBGs, the control section 401 may control restoring TBs.

Also, the control section 401 controls the generation and transmission processes (for example encoding, modulation, mapping etc.) of UL signals based on DCI (UL grants). For example, based on the modulation scheme indicated by the MCS index in DCI, the control section 401 may control the transmission signal generator section 402 to modulate UL signals. Also, the control section 401 may determine the TBS based on the TBS index indicated by the MCS index and the number of allocated resource blocks, and control the transmission signal generating section 402 to encode the UL signal based on the TBS.

Furthermore, the control section 401, when the TBS exceeds a predetermined threshold, code block segmentation, which divides a TBS into multiple CBs, may be applied to the UL signals. Alternatively, based on the application command by higher layer signaling and/or DCI, the control section 401 may apply code block segmentation to UL signals.

In addition, the control section 401 may control transmission of UL signals based on DCI from the radio base station 10. Also, the control section 301 may control retransmission of each CB (or each CBG) constituting UL signals based on DCI from the radio base station 10 (other aspects). To be more specific, the control section 401 may control retransmitting CBs or CBGs specified by DCI using the same numerology or different numerology as that used in the initial transmission.

Also, using a TTI having the same time duration as that used in the initial transmission (first CB/CBG retransmission) or a TTI having a different time duration (second CB/CBG retransmission), the control section 401 may control retransmitting CBs or CBGs specified by DCI.

Furthermore, when retransmission of a plurality of CBs or a plurality of CBGs of different layers is specified by DCI, the control section 401 may control retransmitting a plurality of CBs or a plurality of CBGs separately per layer, or retransmitting them in common between layers (FIG. 7 and FIG. 9).

In addition, the control section 401 may control retransmitting CBs or CBGs bundled with a TB that has been transmitted initially with a different HPN from that of the CB or the CBG and/or bundled with a CB or a CBG retransmitted with a different HPN from that of the CB or the CBG (third CB/CBG retransmission).

For the control section 401, a controller, a control circuit or control apparatus that can be described based on general understanding of the technical field to which the present invention pertains can be used.

The transmission signal generation section 402 generates UL signals and delivery acknowledgement information for DL signals (including, for example, encoding, rate matching, puncturing, modulation, etc.) based on commands from the control section 401, and outputs these signals to the mapping section 403. For the transmission signal generation section 402, a signal generator, a signal generation circuit or signal generation apparatus that can be described based on general understanding of the technical field to which the present invention pertains can be used.

The mapping section 403 maps the UL signals and delivery acknowledgement information for DL signals generated in the transmission signal generation section 402 to radio resources based on commands from the control section 401, and output the result to the transmitting/receiving sections 203. For the mapping section 403, a mapper, a mapping circuit or mapping apparatus that can be described based on general understanding of the technical field to which the present invention pertains can be used.

The received signal processing section 404 performs receiving processes (for example, demapping, demodulation, decoding, etc.) of DL signals. For example, according to a command from the control section 401, the received signal processing section 404 may perform decoding processes on a per CB basis and output the decoding result of each CB to the control section 401.

The received signal processing section 404 outputs the information received from the radio base station 10, to the control section 401. The received signal processing section 404 outputs, for example, broadcast information, system information, higher layer control information by higher layer signaling such as RRC signaling, L1/L2 control information (for example, UL grant, DL assignment, etc.) and so on to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 16:
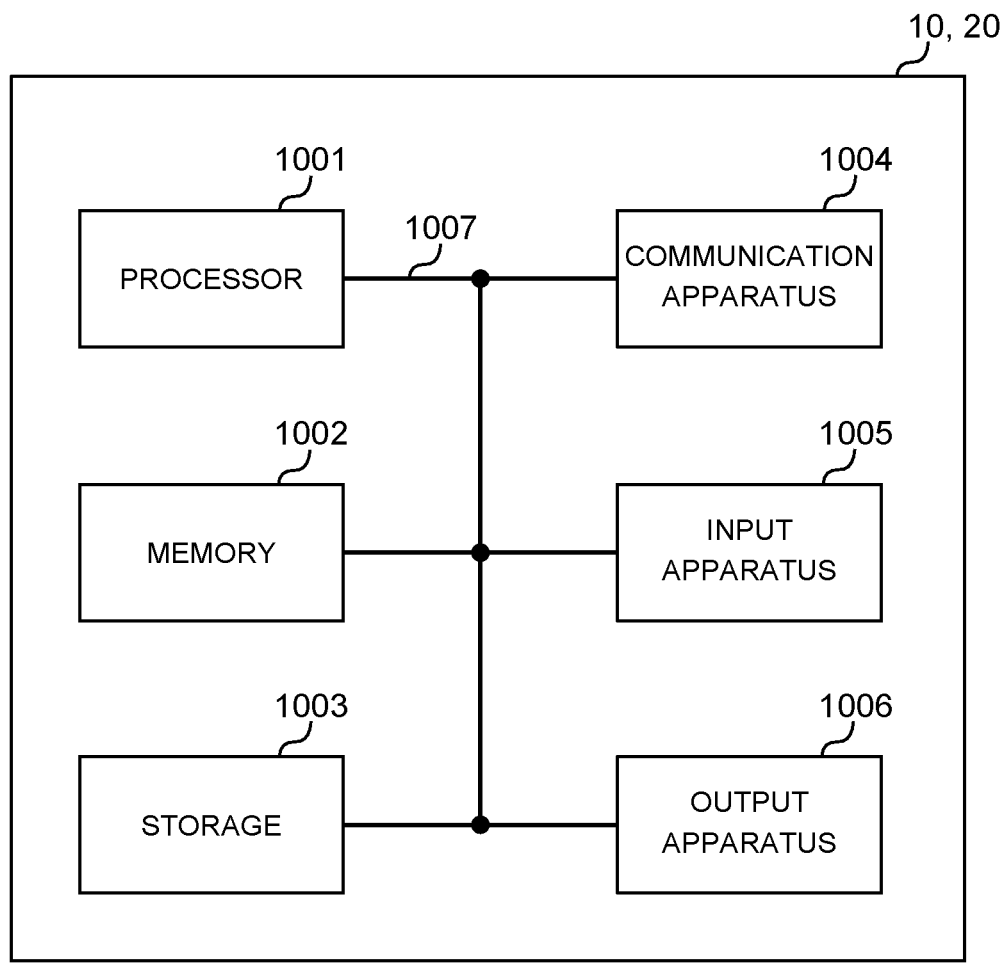
FIG. 16 is a diagram to show an example hardware structure of a radio base station and a user terminal according to the present embodiment.

That is, a radio base station, a user terminal and so on according to an embodiment of the present invention may function as a computer that executes the processes of the radio communication method of the present invention. FIG. 16 is a diagram to show an example hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus.

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling"). Also, "signals" may be "messages. A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe. Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may consist of one or more symbols in the time domain.

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval" (TTI), or a plurality of consecutive subframes may be referred to as a "TTI," or one slot or mini-slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. The TTI may be the transmission time unit of channel-encoded data packets (transport blocks), or may be the unit of processing in scheduling, link adaptation and so on. Note that, when one slot or one minislot is referred to as a "TTI," one or more TTIs (that is, one or more slots or one or more minislots) may be the minimum time unit of scheduling. Also, the number of slots (the number of minislots) to constitute this minimum time unit of scheduling may be controlled.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "minislot," "a subslot" and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that an RB may be referred to as a "physical resource block (PRB: Physical RB)," a "PRB pair," an "RB pair," or the like.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

Note that the radio communication system 1 may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX(registered trademark)), IEEE 802.20, WB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on.

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-017127, filed on Feb. 1, 2017, including the specification, drawings and abstract, is incorporated herein by reference in its entirety.

The invention claimed is:

1. A terminal comprising:
   a receiver that receives downlink control information (DCI) including information that indicates which code block group (CBG) of a transport block (TB) is present; and
   a processor that controls, based on the information, reception or transmission of the CBG using a downlink shared channel or an uplink shared channel that is scheduled by the DCI,
   wherein the DCI includes a field that indicates a common redundancy version between CBGs of the TB, and
   one of 0, 1, 2 and 3 is applied, based on a value of the field, as a redundancy version value.

2. The terminal according to claim 1, wherein when a plurality of TBs of different layers are transmitted, CBGs of the different layers are retransmitted with different TB s per layer.

3. The terminal according to claim 2, wherein the processor determines whether the CBG of the TB is retransmitted or not, based on a new data indicator (NDI) in the DCI.

4. The terminal according to claim 1, wherein the processor determines whether the CBG of the TB is retransmitted or not, based on a new data indicator (NDI) in the DCI.

5. A radio communication method comprising:
   receiving downlink control information (DCI) including information that indicates which code block group (CBG) of a transport block (TB) is present; and
   controlling, based on the information, reception or transmission of the CBG using a downlink shared channel or an uplink shared channel that is scheduled by the DCI,
   wherein the DCI includes a field that indicates a common redundancy version between CBGs of the TB, and
   one of 0, 1, 2 and 3 is applied, based on a value of the field, as a redundancy version value.

6. A base station comprising:
   a transmitter that transmits downlink control information (DCI) including information that indicates which code block group (CBG) of a transport block (TB) is present; and
   a processor that controls a scheduling of a downlink shared channel or an uplink shared channel by the DCI, to control reception or transmission of the CBG in a terminal,
   wherein the DCI includes a field that indicates a common redundancy version between CBGs of the TB, and
   one of 0, 1, 2 and 3 is applied, based on a value of the field, as a redundancy version value.

7. A system comprising a terminal and a base station, wherein:
   the terminal comprises:
      a receiver that receives downlink control information (DCI) including information that indicates which code block group (CBG) of a transport block (TB) is present; and
      a first processor that controls, based on the information, reception or transmission of the CBG using a downlink shared channel or an uplink shared channel that is scheduled by the DCI; and
   the base station comprises:
      a transmitter that transmits the DCI; and
      a second processor that controls a scheduling of the downlink shared channel or the uplink shared channel by the DCI, to control reception or transmission of the CBG in the terminal,
   wherein the DCI includes a field that indicates a common redundancy version between CBGs of the TB, and
   one of 0, 1, 2 and 3 is applied, based on a value of the field, as a redundancy version value.

* * * * *